000000000000000000000000
US011497066B2

(12) United States Patent
Hong

(10) Patent No.: US 11,497,066 B2
(45) Date of Patent: Nov. 8, 2022

(54) METHOD FOR PROCESSING RRC MESSAGE IN RELAY NODE, AND DEVICE FOR SAME

(71) Applicant: KT CORPORATION, Gyeonggi-do (KR)

(72) Inventor: Sung-pyo Hong, Seoul (KR)

(73) Assignee: KT CORPORATION, Gyeonggi-do (KR)

( * ) Notice: Subject to any disclaimer, the term of this patent is extended or adjusted under 35 U.S.C. 154(b) by 0 days.

(21) Appl. No.: 16/969,958

(22) PCT Filed: Feb. 11, 2019

(86) PCT No.: PCT/KR2019/001614
§ 371 (c)(1),
(2) Date: Aug. 13, 2020

(87) PCT Pub. No.: WO2019/160280
PCT Pub. Date: Aug. 22, 2019

(65) Prior Publication Data
US 2020/0413457 A1 Dec. 31, 2020

(30) Foreign Application Priority Data

Feb. 14, 2018 (KR) .......... 10-2018-0018672
Jan. 25, 2019 (KR) .......... 10-2019-0009663

(51) Int. Cl.
*H04W 76/10* (2018.01)
*H04W 92/20* (2009.01)
(Continued)

(52) U.S. Cl.
CPC ............ *H04W 76/10* (2018.02); *H04W 84/04* (2013.01); *H04W 92/18* (2013.01); *H04W 92/20* (2013.01)

(58) Field of Classification Search
CPC . H04W 88/14; H04W 84/047; H04W 88/085; H04W 24/02; H04W 80/02;
(Continued)

(56) References Cited

U.S. PATENT DOCUMENTS

2014/0003329 A1* 1/2014 Chen ............... H04W 16/26
370/315
2014/0269417 A1* 9/2014 Yu ............... H04L 41/0803
370/254
(Continued)

FOREIGN PATENT DOCUMENTS

KR 10-2017-0020234 A 2/2017
KR 10-2017-0027700 A 3/2017
(Continued)

OTHER PUBLICATIONS

3GPP TR 36.806 V9.0.0, dated Mar. 2010 (Year: 2010).*
(Continued)

*Primary Examiner* — Daniel Lai
(74) *Attorney, Agent, or Firm* — IP Legal Services, LLC

(57) ABSTRACT

Provided are a connection control method and device based on integrated access and backhaul (IAB) using 5G NR wireless communication technology. The method of a relay node for processing an RRC message may include: setting a donor base station with a signaling radio bearer or a higher layer protocol connection; receiving an RRC message transmitted from a terminal; and transmitting the RRC message to the donor base station or another relay node using the signaling radio bearer or a higher layer protocol.

4 Claims, 21 Drawing Sheets

(51) Int. Cl.
*H04W 92/18* (2009.01)
*H04W 84/04* (2009.01)

(58) Field of Classification Search
CPC . H04W 40/22; H04W 48/12; H04W 72/1257; H04W 28/0263; H04W 76/18; H04W 28/10; H04W 76/12; H04W 88/04; H04W 16/26; H04W 24/04; H04W 28/02; H04W 76/10; H04W 16/00; H04W 28/0236; H04W 92/20; H04W 92/18; H04W 84/04; H04W 48/20; H04L 1/1861; H04L 1/08; H04B 7/15528; H04B 7/15542; H04B 7/2606; H04B 7/15507; H04B 3/36; H04B 7/15; H04B 7/14; H04B 10/0777; H04B 17/40

See application file for complete search history.

(56) References Cited

U.S. PATENT DOCUMENTS

| | | | |
|---|---|---|---|
| 2015/0195032 A1* | 7/2015 | Sharma | H04B 7/15592 370/315 |
| 2017/0048906 A1 | 2/2017 | Lee et al. | |
| 2017/0094700 A1 | 3/2017 | Hong et al. | |
| 2017/0150424 A1 | 5/2017 | Lee et al. | |
| 2018/0351907 A1 | 12/2018 | Ryu et al. | |
| 2019/0090257 A1* | 3/2019 | Han | H04W 28/0268 |
| 2019/0215055 A1* | 7/2019 | Majmundar | H04W 40/12 |
| 2019/0223002 A1* | 7/2019 | Novlan | H04W 24/02 |
| 2020/0229181 A1* | 7/2020 | Qi | H04W 88/14 |
| 2020/0344843 A1* | 10/2020 | Zhu | H04W 24/02 |
| 2020/0413457 A1 | 12/2020 | Hong | |

FOREIGN PATENT DOCUMENTS

| | | |
|---|---|---|
| KR | 10-2017-0037493 A | 4/2017 |
| KR | 10-2017-0063067 A | 6/2017 |
| KR | 10-2019-0098692 A | 8/2019 |

OTHER PUBLICATIONS

Huawei et al., "Comparison of L2 and L3 relay architectures", R2-1801 132, 3GPP TSG-RAN WG2 Ad Hoc, Vancouver, Canada, Jan. 22-26, 2018, pp. 1-3.

Ericsson, "Architecture for integrated access and backhaul", R2-1801022, 3GPP TSG-RAN WG2 NR AH1801, Vancouver, Canada, Jan. 22-26, 2018, pp. 1-9.

Intel Corporation, "Scenario and architecture for IAB", R2-1800953, 3GPP TSG RAN WG2 Meeting #AH 1801, Vancouver, Canada, Jan. 22-Jan. 26, 2018, pp. 1-5.

* cited by examiner

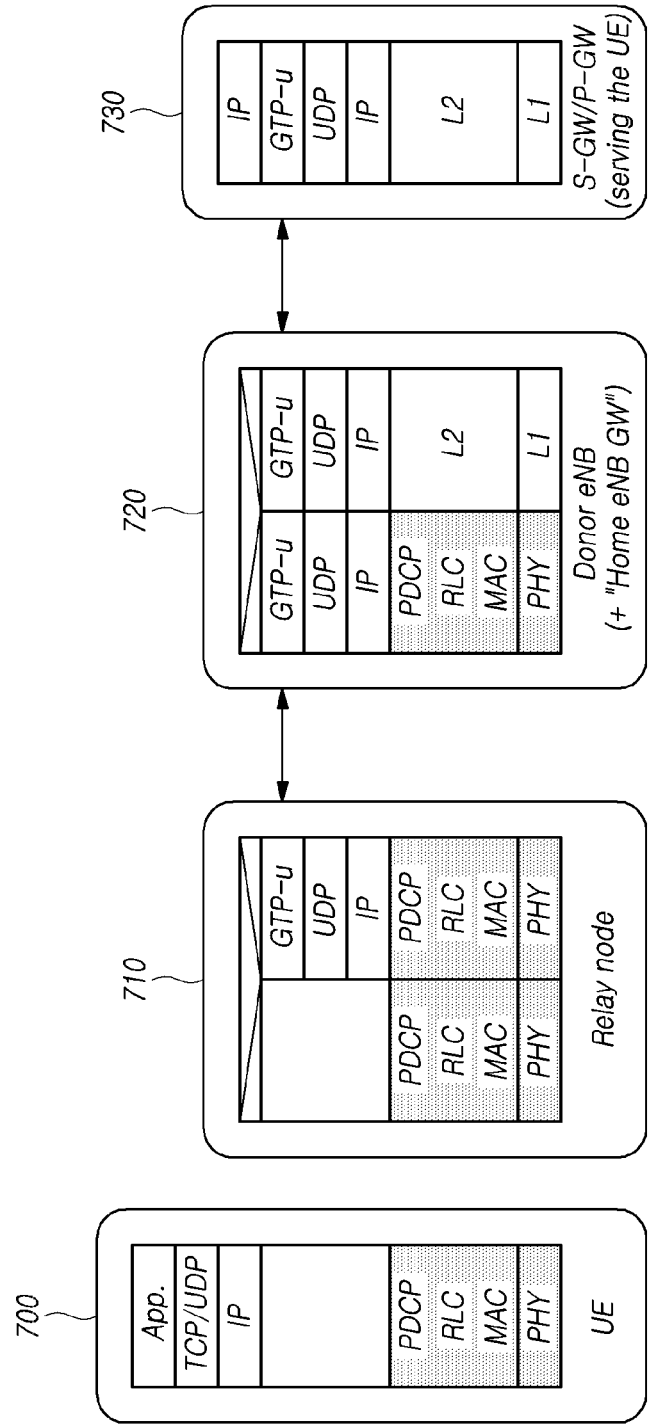

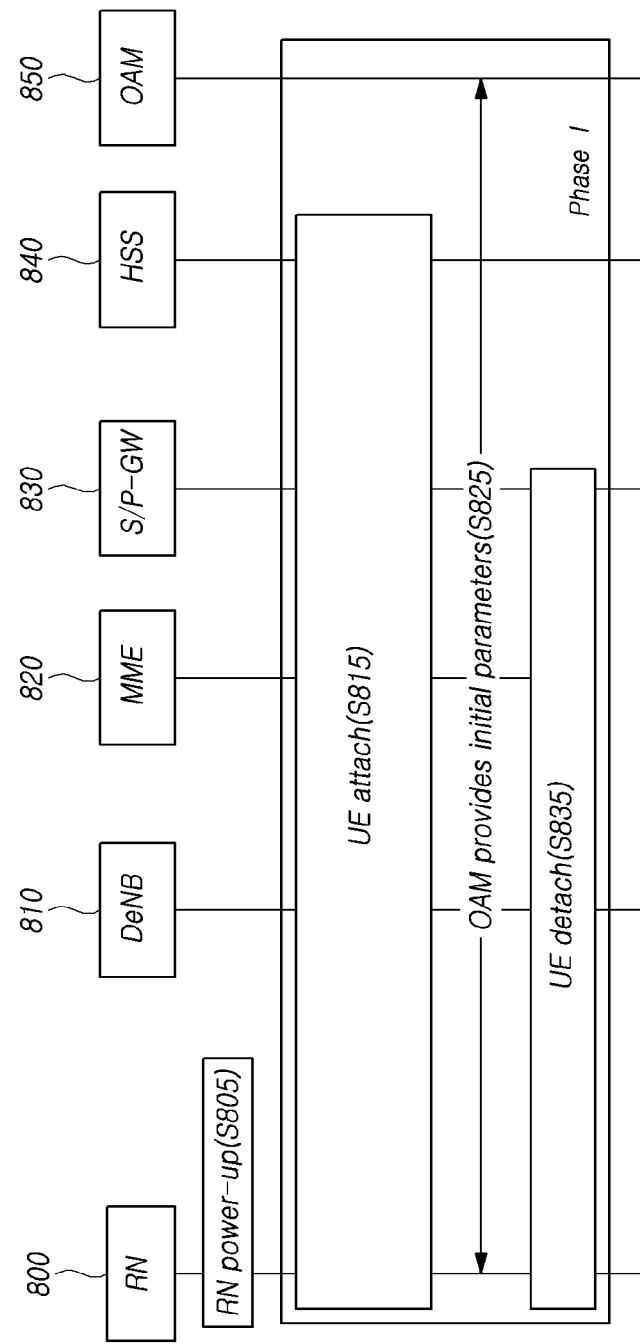

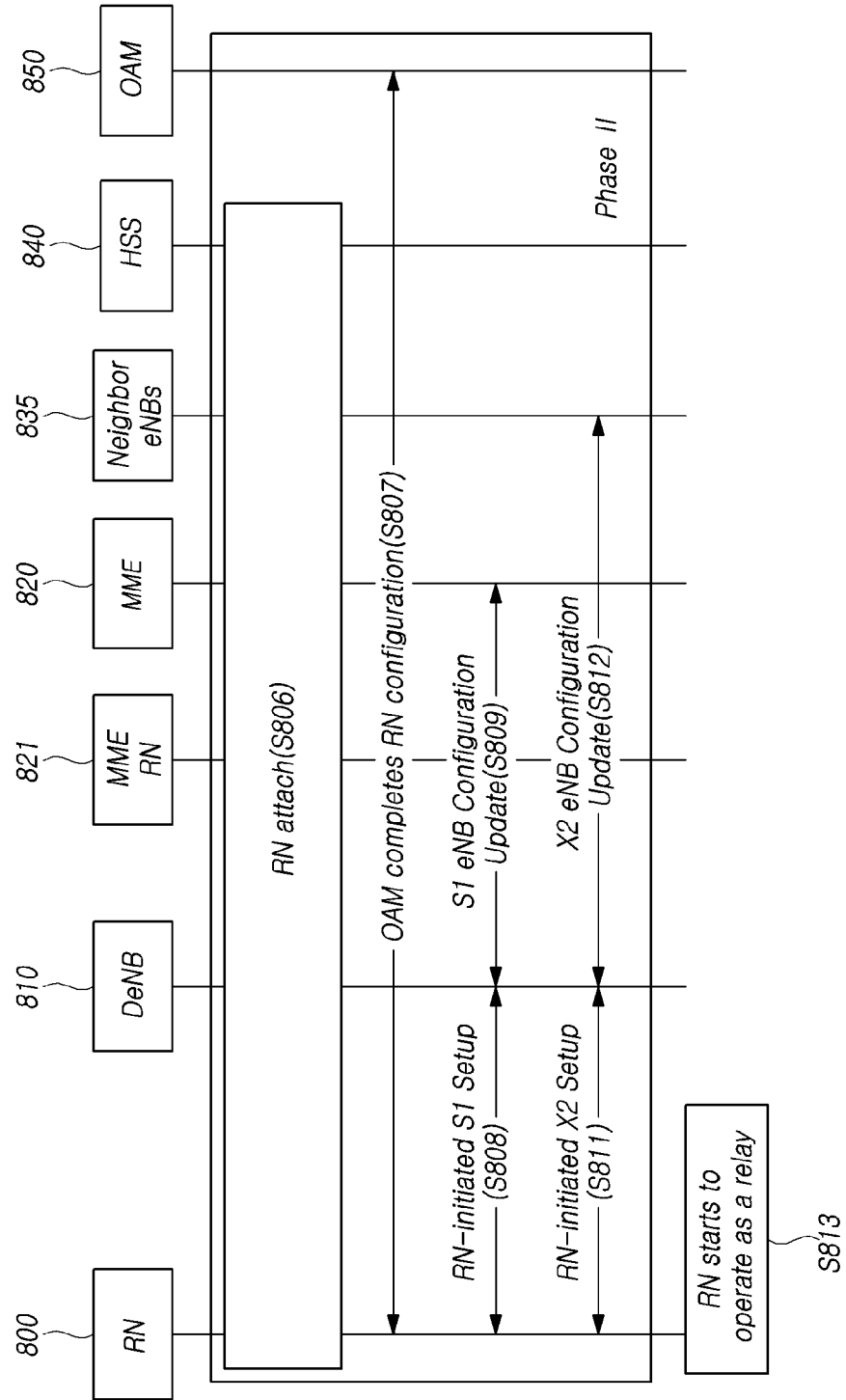

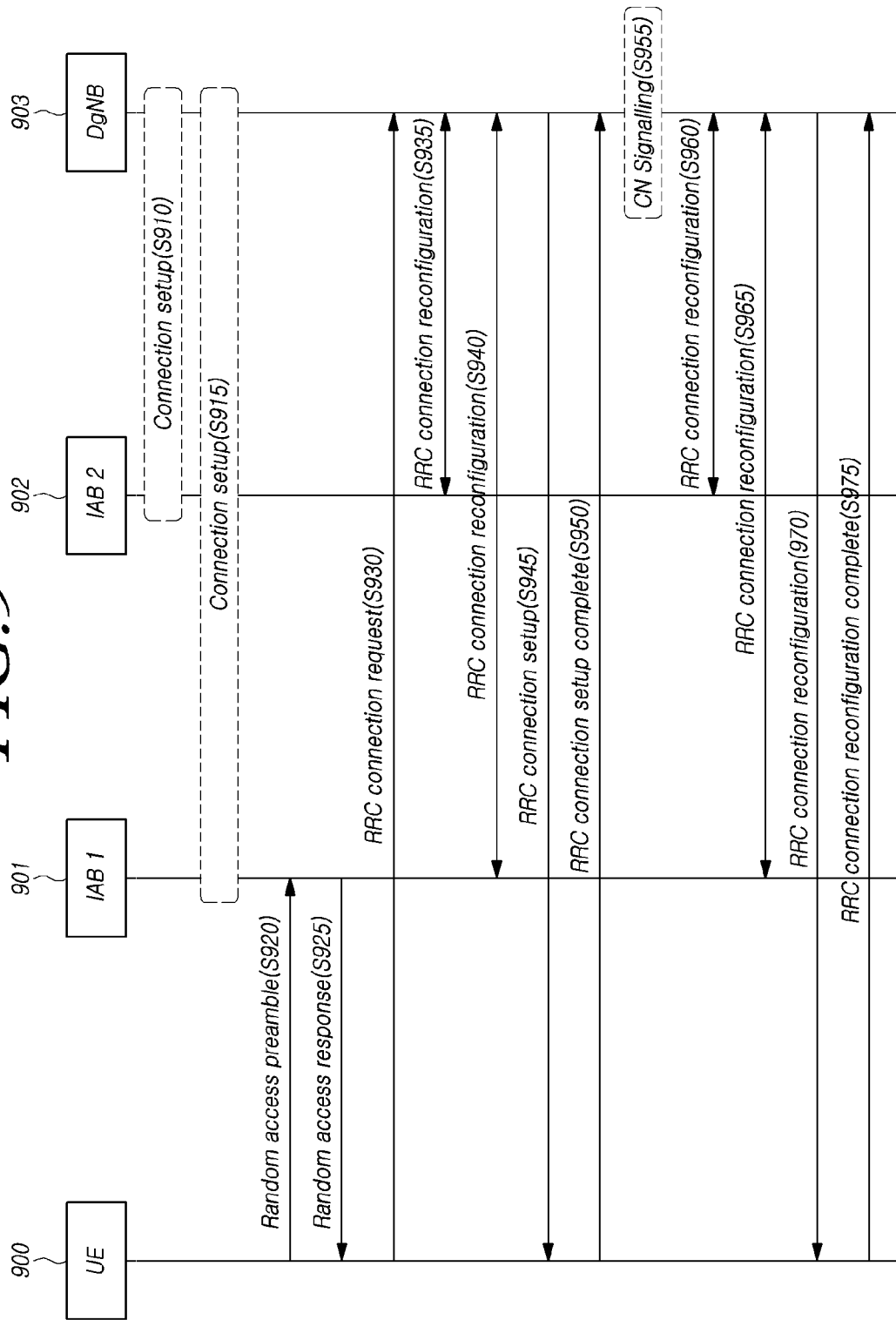

METHOD FOR PROCESSING RRC MESSAGE IN RELAY NODE, AND DEVICE FOR SAME

CROSS REFERENCE TO RELATED APPLICATIONS

This application is a National Stage Patent Application of PCT International Patent Application No. PCT/KR2019/001614 (filed on Feb. 11, 2019) under 35 U.S.C. § 371, which claims priority to Korean Patent Application Nos. 10-2018-0018672 (filed on Feb. 14, 2018), and 10-2019-0009663 (filed on Jan. 25, 2019), the teachings of which are incorporated herein in their entireties by reference.

TECHNICAL FIELD

The disclosure relates to a connection control method and device based on integrated access and backhaul (IAB) using 5G NR wireless communication technology.

BACKGROUND ART

In wireless communication systems, relay technology has been adopted to expand cell coverage using additional network nodes.

Thus, typical relay technology adopting LTE technology supports data transfer at the IP packet level of the relay node and is configured to allow only one relay node to transfer IP packets between the UE and the base station.

In other words, typical relay technology adopting LTE technology provides only a single hop relay function to provide simple services, and most of the configuration is made via static operations, administration, and management (OAM). Thus, the typical art is unable to configure a plurality of hop relays.

Upon attempting to support multiple hop relays via the typical LTE technology, it is impossible to separately process data via a plurality of relay nodes, and over-IP layer signaling and data processing may increase latency.

Therefore, there is a demand for research on various protocol structures to meet the quality of each service in multiple hops.

DETAILED DESCRIPTION OF THE INVENTION

Technical Problem

In the above-described background, according to an embodiment of the disclosure, a relay structure is provided for effectively distinguishing and processing data according to the requirements per UE or per service when a plurality of relay hops are configured.

Further, according to an embodiment, an RRC message processing method is provided for relaying an RRC message via one or more hops while maintaining the security between the UE and the base station in a multi-hop relay structure.

Technical Solution

According to an embodiment, a method may be provided for processing an RRC message by a relay node. The method may include configuring a signaling radio bearer or a higher layer protocol connection with a donor base station; receiving an RRC message transmitted from a user equipment (UE) and transmitting the RRC message to the donor base station or another relay node using the signaling radio bearer or the higher layer protocol.

According to an embodiment, a relay node may be provided for processing an RRC message. The relay node may include a controller configuring a signaling radio bearer or a higher layer protocol connection with a donor base station, a receiver receiving an RRC message transmitted from a UE, and a transmitter transmitting the RRC message to the donor base station or another relay node using the signaling radio bearer or the higher layer protocol.

Advantageous Effects

According to the embodiments of the present disclosure, a plurality of relay hops may be dynamically configured, and data may be effectively distinguished and processed based on the requirements for each UE or for each service.

According to the embodiments of the present disclosure, delays in data processing and over-IP layer signaling may be prevented while maintaining the security of the RRC message transferred in a relay structure.

BRIEF DESCRIPTION OF DRAWINGS

FIG. 7 is a view illustrating an exemplary relay-based user plane protocol structure in LTE technology;

FIGS. 8A and 8B are views illustrating a relay node (RN) startup procedure in LTE technology;

FIG. 9 is a view illustrating an RRC connection configuration procedure using a relay node according to an embodiment;

MODE FOR CARRYING OUT THE INVENTION

Figure 1:
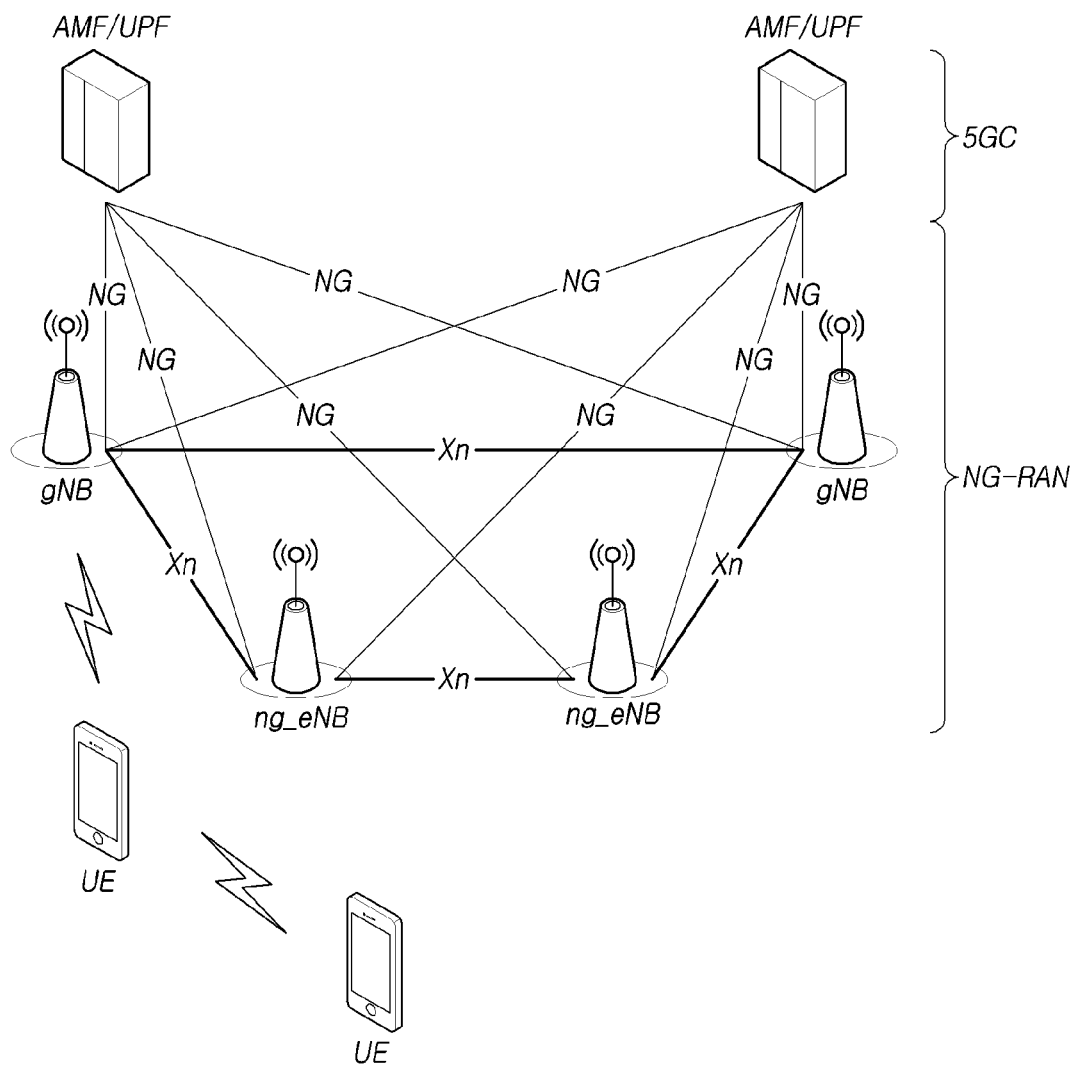
FIG. 1 is a view schematically illustrating an NR wireless communication system in accordance with embodiments of the present disclosure.

Hereinafter, embodiments of the disclosure are described in detail with reference to the accompanying drawings. The same or substantially the same reference denotations are used to refer to the same or substantially the same elements throughout the specification and the drawings. When determined to make the subject matter of the present invention unclear, the detailed of the known art or functions may be skipped. Hereinafter, some embodiments of the present disclosure will be described in detail with reference to the accompanying illustrative drawings. In the drawings, like reference numerals are used to denote like elements throughout the drawings, even if they are shown on different drawings. Further, in the following description of the present disclosure, a detailed description of known functions and configurations incorporated herein will be omitted when it may make the subject matter of the present disclosure rather unclear.

In addition, terms, such as first, second, A, B, (A), (B) or the like may be used herein when describing components of the present disclosure. Each of these terminologies is not used to define an essence, order or sequence of a corresponding component but used merely to distinguish the corresponding component from other component(s). In describing the positional relationship between components, if two or more components are described as being "connected", "combined", or "coupled" to each other, it should be understood that two or more components may be directly "connected", "combined", or "coupled" to each other, and that two or more components may be "connected", "combined", or "coupled" to each other with another component "interposed" therebetween. In this case, another component may be included in at least one of the two or more components that are "connected", "combined", or "coupled" to each other.

The terms or technical denotations used herein are provided solely for the purpose of describing specific embodiments and the technical spirit is not limited thereto. The terms used herein may be interpreted as generally appreciated by one of ordinary skill in the art unless defined otherwise. As used herein, terms wrong or inappropriate for representing the spirit of the present invention may be replaced with and understood as more proper ones to represent the spirit of the present invention by one of ordinary skill in the art. General terms as used herein should be interpreted in the context of the specification or as defined in dictionaries.

The wireless communication system in the present specification refers to a system for providing various communication services, such as a voice service and a data service, using radio resources. The wireless communication system may include a user equipment (UE), a base station, a core network, and the like.

Embodiments disclosed below may be applied to a wireless communication system using various radio access technologies. For example, the embodiments may be applied to various radio access technologies such as code division multiple access (CDMA), frequency division multiple access (FDMA), time division multiple access (TDMA), orthogonal frequency division multiple access (OFDMA), single-carrier frequency division multiple access (SC-FDMA), non-orthogonal multiple access (NOMA), or the like. In addition, the radio access technology may refer to respective generation communication technologies established by various communication organizations, such as 3GPP, 3GPP2, Wi-Fi®, Bluetooth®, IEEE, ITU, or the like, as well as a specific access technology. For example, CDMA may be implemented as a wireless technology such as universal terrestrial radio access (UTRA) or CDMA2000. TDMA may be implemented as a wireless technology such as global system for mobile communications (GSM)/general packet radio service (GPRS)/enhanced data rates for GSM evolution (EDGE). OFDMA may be implemented as a wireless technology such as IEEE (Institute of Electrical and Electronics Engineers) 802.11 (Wi-Fi®), IEEE 802.16 (WiMAX), IEEE 802-20, evolved UTRA (E-UTRA), and the like. IEEE 802.16m is evolution of IEEE 802.16e, which provides backward compatibility with systems based on IEEE 802.16e. UTRA is a part of a universal mobile telecommunications system (UMTS). 3GPP (3rd-generation partnership project) LTE (long-term evolution) is a part of E-UMTS (evolved UMTS) using evolved-UMTS terrestrial radio access (E-UTRA), which adopts OFDMA in a downlink and SC-FDMA in an uplink. As described above, the embodiments may be applied to radio access technologies that have been launched or commercialized, and may be applied to radio access technologies that are being developed or will be developed in the future.

The UE used in the specification must be interpreted as a broad meaning that indicates a device including a wireless communication module that communicates with a base station in a wireless communication system. For example, the UE includes user equipment (UE) in WCDMA, LTE, NR, HSPA, IMT-2020 (5G or New Radio), and the like, a mobile station in GSM, a user terminal (UT), a subscriber station (SS), a wireless device, and the like. In addition, the UE may be a portable user device, such as a smart phone, or may be a vehicle, a device including a wireless communication module in the vehicle, and the like in a V2X communication system according to the usage type thereof. In the case of a machine-type communication (MTC) system, the UE may refer to an MTC terminal, or an M2M terminal, which employs a communication module capable of performing machine-type communication.

A base station or a cell in the present specification refers to an end that communicates with a UE through a network and encompasses various coverage regions such as a Node-B, an evolved Node-B (eNB), a gNode-B, a low-power node (LPN), a sector, a site, various types of antennas, a base transceiver system (BTS), an access point, a point (e.g., a transmission point, a reception point, or a transmission/reception point), a relay node, a megacell, a macrocell, a microcell, a picocell, a femtocell, a remote radio head (RRH), a radio unit (RU), a small cell, and the like.

The various cells listed above are provided with a base station controlling one or more cells, and the base station may be interpreted as two meanings. The base station may be 1) a device for providing a megacell, a macrocell, a microcell, a picocell, a femtocell, or a small cell in connection with a wireless region, or the base station may be 2) a wireless region itself. In the above description 1), the base station may be the devices controlled by the same entity and providing predetermined wireless regions or all devices interacting with each other and cooperatively configuring a wireless region. For example, the base station may be a point, a transmission/reception point, a transmission point, a reception point, and the like according to the configuration method of the wireless region. In the above description 2), the base station may be the wireless region in which a user equipment (UE) may be enabled to transmit data to and receive data from the other UE or a neighboring base station.

In this specification, the cell may refer to coverage of a signal transmitted from a transmission/reception point, a component carrier having coverage of a signal transmitted from a transmission/reception point (or a transmission point), or a transmission/reception point itself.

An uplink (UL) refers to a scheme of transmitting data from a UE to a base station, and a downlink (DL) refers to a scheme of transmitting data from a base station to a UE. The downlink may mean communication or communication paths from multiple transmission/reception points to a UE, and the uplink may mean communication or communication paths from a UE to multiple transmission/reception points. In the downlink, a transmitter may be a part of the multiple transmission/reception points, and a receiver may be a part of the UE. In addition, in the uplink, the transmitter may be a part of the UE, and the receiver may be a part of the multiple transmission/reception points.

The uplink and downlink transmit and receive control information over a control channel, such as a physical downlink control channel (PDCCH) and a physical uplink control channel (PUCCH). The uplink and downlink transmit and receive data over a data channel such as a physical downlink shared channel (PDSCH) and a physical uplink shared channel (PUSCH). Hereinafter, the transmission and reception of a signal over a channel, such as PUCCH, PUSCH, PDCCH, PDSCH, or the like, may be expressed as "PUCCH, PUSCH, PDCCH, PDSCH, or the like is transmitted and received".

For the sake of clarity, the following description will focus on 3GPP LTE/LTE-A/NR (New Radio) communication systems, but technical features of the disclosure are not limited to the corresponding communication systems.

The 3GPP has been developing a 5G (5th-Generation) communication technology in order to meet the requirements of a next-generation radio access technology of ITU-R after studying 4G (4th-generation) communication technology. Specifically, 3GPP is developing, as a 5G communication technology, LTE-A pro by improving the LTE-Advanced technology so as to conform to the requirements of ITU-R and a new NR communication technology that is totally different from 4G communication technology. LTE-A pro and NR all refer to the 5G communication technology. Hereinafter, the 5G communication technology will be described on the basis of NR unless a specific communication technology is specified.

Various operating scenarios have been defined in NR in consideration of satellites, automobiles, new verticals, and the like in the typical 4G LTE scenarios so as to support an enhanced mobile broadband (eMBB) scenario in terms of services, a massive machine-type communication (mMTC) scenario in which UEs spread over a broad region at a high UE density, thereby requiring low data rates and asynchronous connections, and an ultra-reliability and low-latency (URLLC) scenario that requires high responsiveness and reliability and supports high-speed mobility.

In order to satisfy such scenarios, NR introduces a wireless communication system employing a new waveform and frame structure technology, a low-latency technology, a super-high frequency band (mmWave) support technology, and a forward compatible provision technology. In particular, the NR system has various technological changes in terms of flexibility in order to provide forward compatibility. The primary technical features of NR will be described below with reference to the drawings.

<Overview of NR System>

FIG. 1 is a view schematically illustrating an NR system to which the present embodiment is applicable.

Referring to FIG. 1, the NR system is divided into a 5G core network (5GC) and an NG-RAN part. The NG-RAN includes gNBs and ng-eNBs providing user plane (SDAP/PDCP/RLC/MAC/PHY) and user equipment (UE) control plane (RRC) protocol ends. The gNBs or the gNB and the ng-eNB are connected to each other through Xn interfaces. The gNB and the ng-eNB are connected to the 5GC through NG interfaces, respectively. The 5GC may be configured to include an access and mobility management function (AMF) for managing a control plane, such as a UE connection and mobility control function, and a user plane function (UPF) controlling user data. NR supports both frequency bands below 6 GHz (frequency range 1 FR1 FR1) and frequency bands equal to or greater than 6 GHz (frequency range 2 FR2 FR2).

The gNB denotes a base station that provides a UE with an NR user plane and control plane protocol end. The ng-eNB denotes a base station that provides a UE with an E-UTRA user plane and control plane protocol end. The base station described in the present specification should be understood as encompassing the gNB and the ng-eNB. However, the base station may be also used to refer to the gNB or the ng-eNB separately from each other, as necessary.

<NR Waveform, Numerology, and Frame Structure>

NR uses a CP-OFDM waveform using a cyclic prefix for downlink transmission and uses CP-OFDM or DFT-s-OFDM for uplink transmission. OFDM technology is easy to combine with a multiple-input multiple-output (MIMO) scheme and allows a low-complexity receiver to be used with high frequency efficiency.

Since the three scenarios described above have different requirements for data rates, delay rates, coverage, and the like from each other in NR, it is necessary to efficiently satisfy the requirements for each scenario over frequency bands constituting the NR system. To this end, a technique for efficiently multiplexing radio resources based on a plurality of different numerologies has been proposed.

Specifically, the NR transmission numerology is determined on the basis of subcarrier spacing and a cyclic prefix (CP). As shown in Table 1 below, "μ" is used as an exponential value of 2 so as to be changed exponentially on the basis of 15 kHz.

TABLE 1

| μ | Subcarrier spacing | Cyclic prefix | Supported for data | Supported for synch |
|---|---|---|---|---|
| 0 | 15 | Normal | Yes | Yes |
| 1 | 30 | Normal | Yes | Yes |

TABLE 1-continued

| μ | Subcarrier spacing | Cyclic prefix | Supported for data | Supported for synch |
|---|---|---|---|---|
| 2 | 60 | Normal, Extended | Yes | No |
| 3 | 120 | Normal | Yes | Yes |
| 4 | 240 | Normal | No | Yes |

Figure 2:
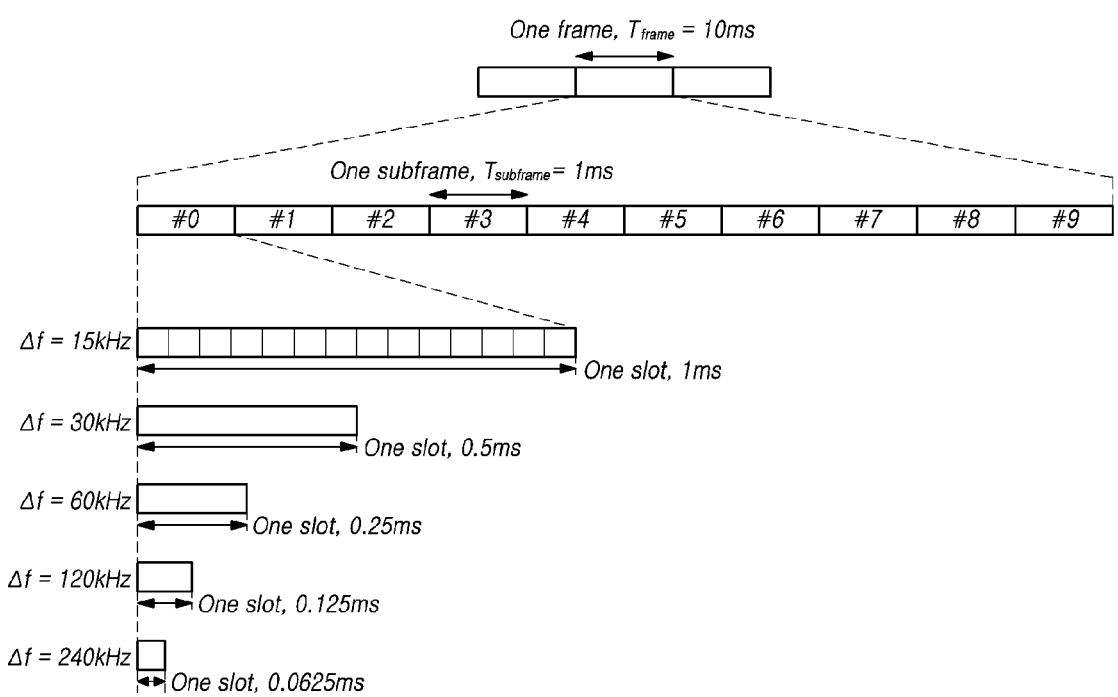
FIG. 2 is a view schematically illustrating a frame structure in an NR system in accordance with embodiments of the present disclosure.

As shown in Table 1 above, NR may have five types of numerologies according to subcarrier spacing. This is different from LTE, which is one of the 4G-communication technologies, in which the subcarrier spacing is fixed to 15 kHz. Specifically, in NR, subcarrier spacing used for data transmission is 15, 30, 60, or 120 kHz, and subcarrier spacing used for synchronization signal transmission is 15, 30, 120, or 240 kHz. In addition, an extended CP is applied only to the subcarrier spacing of 60 kHz. A frame that includes 10 subframes each having the same length of 1 ms and has a length of 10 ms is defined in the frame structure in NR. One frame may be divided into half frames of 5 ms, and each half frame includes 5 subframes. In the case of a subcarrier spacing of 15 kHz, one subframe includes one slot, and each slot includes 14 OFDM symbols. FIG. 2 is a view for explaining a frame structure in an NR system to which the present embodiment may be applied. Referring to FIG. 2, a slot includes 14 OFDM symbols, which are fixed, in the case of a normal CP, but the length of the slot in the time domain may be varied depending on subcarrier spacing. For example, in the case of a numerology having a subcarrier spacing of 15 kHz, the slot is configured to have the same length of 1 ms as that of the subframe. On the other hand, in the case of a numerology having a subcarrier spacing of 30 kHz, the slot includes 14 OFDM symbols, but one subframe may include two slots each having a length of 0.5 ms. That is, the subframe and the frame may be defined using a fixed time length, and the slot may be defined as the number of symbols such that the time length thereof is varied depending on the subcarrier spacing.

NR defines a basic unit of scheduling as a slot and also introduces a minislot (or a subslot or a non-slot-based schedule) in order to reduce a transmission delay of a radio section. If wide subcarrier spacing is used, the length of one slot is shortened in inverse proportion thereto, thereby reducing a transmission delay in the radio section. A minislot (or subslot) is intended to efficiently support URLLC scenarios, and the minislot may be scheduled in 2, 4, or 7 symbol units.

In addition, unlike LTE, NR defines uplink and downlink resource allocation as a symbol level in one slot. In order to reduce a HARQ delay, the slot structure capable of directly transmitting HARQ ACK/NACK in a transmission slot has been defined. Such a slot structure is referred to as a "self-contained structure", which will be described.

NR was designed to support a total of 256 slot formats, and 62 slot formats thereof are used in 3GPP Rel-15. In addition, NR supports a common frame structure constituting an FDD or TDD frame through combinations of various slots. For example, NR supports i) a slot structure in which all symbols of a slot are configured for a downlink, ii) a slot structure in which all symbols are configured for an uplink, and iii) a slot structure in which downlink symbols and uplink symbols are mixed. In addition, NR supports data transmission that is scheduled to be distributed to one or more slots. Accordingly, the base station may inform the UE of whether the slot is a downlink slot, an uplink slot, or a flexible slot using a slot format indicator (SFI). The base station may inform a slot format by instructing, using the SFI, the index of a table configured through UE-specific radio resource control (RRC) signaling. Further, the base station may dynamically instruct the slot format through downlink control information (DCI) or may statically or quasi-statically instruct the same through RRC signaling.

<Physical Resources of NR>

With regard to physical resources in NR, antenna ports, resource grids, resource elements, resource blocks, bandwidth parts, and the like are taken into consideration.

The antenna port is defined to infer a channel carrying a symbol on an antenna port from the other channel carrying another symbol on the same antenna port. If large-scale properties of a channel carrying a symbol on an antenna port can be inferred from the other channel carrying a symbol on another antenna port, the two antenna ports may have a quasi-co-located or quasi-co-location (QC/QCL) relationship. The large-scale properties include at least one of delay spread, Doppler spread, a frequency shift, an average received power, and a received timing.

Figure 3:
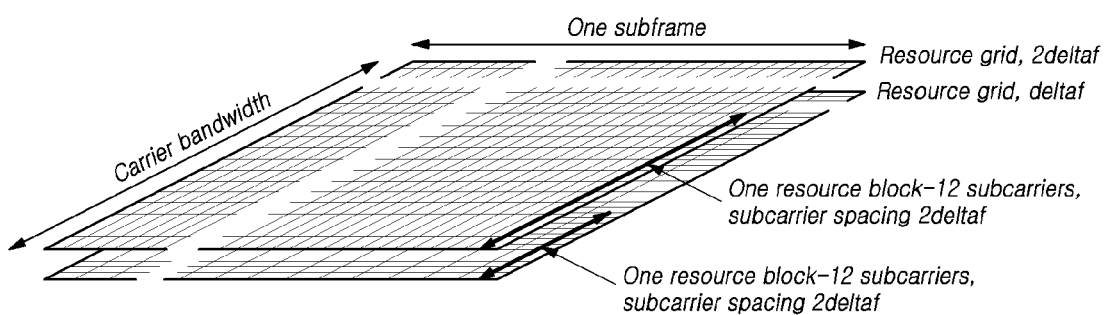
FIG. 3 is a view for explaining resource grids supported by a radio access technology in accordance with embodiments of the present disclosure.

FIG. 3 illustrates resource grids supported by a radio access technology in accordance with embodiments of the present disclosure.

Referring to FIG. 3, resource grids may exist according to respective numerologies because NR supports a plurality of numerologies in the same carrier. In addition, the resource grids may exist depending on antenna ports, subcarrier spacing, and transmission directions.

A resource block includes 12 subcarriers and is defined only in the frequency domain. In addition, a resource element includes one OFDM symbol and one subcarrier. Therefore, as shown in FIG. 3, the size of one resource block may be varied according to the subcarrier spacing. Further, "Point A" that acts as a common reference point for the resource block grids, a common resource block, and a virtual resource block are defined in NR.

Figure 4:
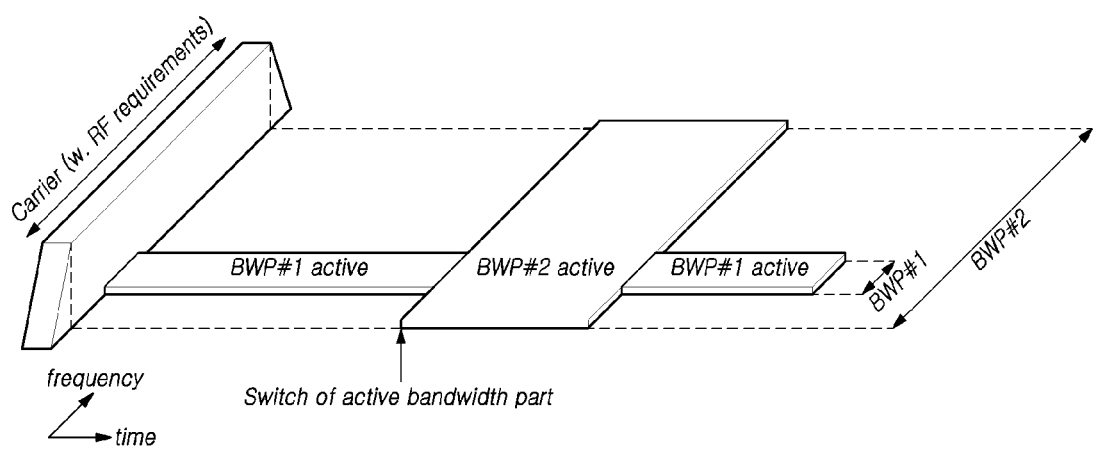
FIG. 4 is a view for explaining bandwidth parts supported by a radio access technology in accordance with embodiments of the present disclosure.

FIG. 4 illustrates bandwidth parts supported by a radio access technology in accordance with embodiments of the present disclosure.

Unlike LTE in which the carrier bandwidth is fixed to 20 MHz, the maximum carrier bandwidth is configured as 50 MHz to 400 MHz depending on the subcarrier spacing in NR. Therefore, it is not assumed that all UEs use the entire carrier bandwidth. Accordingly, as shown in FIG. 4, bandwidth parts (BWPs) may be specified within the carrier bandwidth in NR so that the UE may use the same. In addition, the bandwidth part may be associated with one numerology, may include a subset of consecutive common resource blocks, and may be activated dynamically over time. The UE has up to four bandwidth parts in each of the uplink and the downlink. The UE transmits and receives data using an activated bandwidth part during a given time.

In the case of a paired spectrum, uplink and downlink bandwidth parts are configured independently. In the case of an unpaired spectrum, in order to prevent unnecessary frequency re-tuning between a downlink operation and an uplink operation, the downlink bandwidth part and the uplink bandwidth part are configured in pairs to share a center frequency.

<Initial Access in NR>

In NR, a UE performs a cell search and a random access procedure in order to access and communicates with a base station.

The cell search is a procedure of the UE for synchronizing with a cell of a corresponding base station using a synchronization signal block (SSB) transmitted from the base station and acquiring a physical-layer cell ID and system information.

Figure 5:
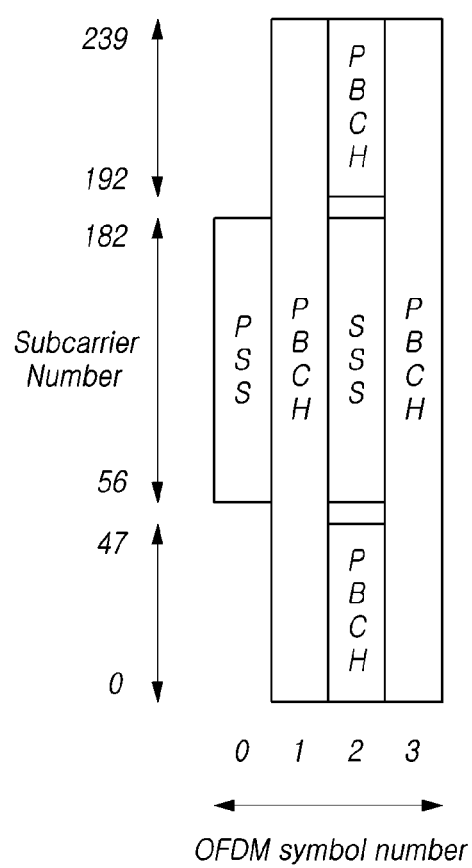
FIG. 5 is a view illustrating an example of a synchronization signal block in a radio access technology in accordance with embodiments of the present disclosure.

FIG. 5 illustrates an example of a synchronization signal block in a radio access technology in accordance with embodiments of the present disclosure.

Referring to FIG. 5, the SSB includes a primary synchronization signal (PSS) and a secondary synchronization signal (SSS), which occupy one symbol and 127 subcarriers, and PBCHs spanning three OFDM symbols and 240 subcarriers.

The UE monitors the SSB in the time and frequency domain, thereby receiving the SSB.

The SSB may be transmitted up to 64 times for 5 ms. A plurality of SSBs are transmitted by different transmission beams within a time of 5 ms, and the UE performs detection on the assumption that the SSB is transmitted every 20 ms based on a specific beam used for transmission. The number of beams that may be used for SSB transmission within 5 ms may be increased as the frequency band is increased. For example, up to 4 SSB beams may be transmitted at a frequency band of 3 GHz or less, and up to 8 SSB beams may be transmitted at a frequency band of 3 to 6 GHz. In addition, the SSBs may be transmitted using up to 64 different beams at a frequency band of 6 GHz or more.

One slot includes two SSBs, and a start symbol and the number of repetitions in the slot are determined according to subcarrier spacing as follows.

Unlike the SS in the typical LTE system, the SSB is not transmitted at the center frequency of a carrier bandwidth. That is, the SSB may also be transmitted at the frequency other than the center of the system band, and a plurality of SSBs may be transmitted in the frequency domain in the case of supporting a broadband operation. Accordingly, the UE monitors the SSB using a synchronization raster, which is a candidate frequency position for monitoring the SSB. A carrier raster and a synchronization raster, which are the center frequency position information of the channel for the initial connection, were newly defined in NR, and the synchronization raster may support a fast SSB search of the UE because the frequency spacing thereof is configured to be wider than that of the carrier raster.

The UE may acquire an MIB over the PBCH of the SSB. The MIB (master information block) includes minimum information for the UE to receive remaining minimum system information (RMSI) broadcast by the network. In addition, the PBCH may include information on the position of the first DM-RS symbol in the time domain, information for the UE to monitor SIB1 (e.g., SIB1 numerology information, information related to SIB1 CORESET, search space information, PDCCH-related parameter information, etc.), offset information between the common resource block and the SSB (the position of an absolute SSB in the carrier is transmitted via SIB1), and the like. The SIB1 numerology information is also applied to message 2 or message 4 used in the random access procedure for the UE to access the base station after completing the cell search procedure.

The above-mentioned RMSI may mean SIB1 (system information block 1), and SIB1 is broadcast periodically (e.g., 160 ms) in the cell. SIB1 includes information necessary for the UE to perform the initial random access procedure, and SIB1 is periodically transmitted over a PDSCH. In order to receive SIB1, the UE must receive numerology information used for the SIB1 transmission and the CORESET (control resource set) information used for scheduling of SIB1 over a PBCH. The UE identifies scheduling information for SIB1 using SI-RNTI in the CORESET. The UE acquires SIB1 on the PDSCH according to scheduling information. The remaining SIBs other than SIB1 may be periodically transmitted, or the remaining SIBs may be transmitted according to the request of the UE.

Figure 6:
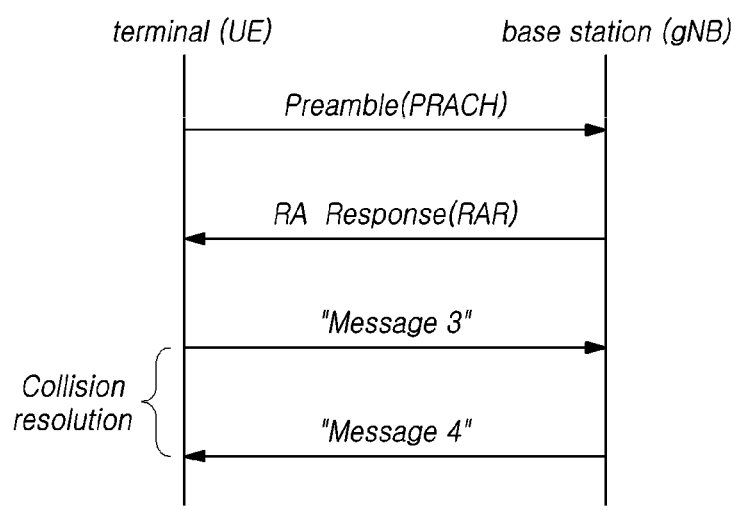
FIG. 6 is a signal diagram for explaining a random access procedure in a radio access technology in accordance with embodiments of the present disclosure.

FIG. 6 is a view for explaining a random access procedure in a radio access technology to which the present embodiment is applicable.

Referring to FIG. 6, if a cell search is completed, the UE transmits a random access preamble for random access to the base station. The random access preamble is transmitted over a PRACH. Specifically, the random access preamble is periodically transmitted to the base station over the PRACH that includes consecutive radio resources in a specific slot repeated. In general, a contention-based random access procedure is performed when the UE makes initial access to a cell, and a non-contention-based random access procedure is performed when the UE performs random access for beam failure recovery (BFR).

The UE receives a random access response to the transmitted random access preamble. The random access response may include a random access preamble identifier (ID), UL Grant (uplink radio resource), a temporary C-RNTI (temporary cell-radio network temporary identifier), and a TAC (time alignment command). Since one random access response may include random access response information for one or more UEs, the random access preamble identifier may be included in order to indicate the UE for which the included UL Grant, temporary C-RNTI, and TAC are valid. The random access preamble identifier may be an identifier of the random access preamble received by the base station. The TAC may be included as information for the UE to adjust uplink synchronization. The random access response may be indicated by a random access identifier on the PDCCH, i.e., a random access-radio network temporary identifier (RA-RNTI).

Upon receiving a valid random access response, the UE processes information included in the random access response and performs scheduled transmission to the base station. For example, the UE applies the TAC and stores the temporary C-RNTI. In addition, the UE transmits, to the base station, data stored in the buffer of the UE or newly generated data using the UL Grant. In this case, information for identifying the UE must be included in the data.

Lastly, the UE receives a downlink message to resolve the contention.

As used herein, the frequency, frame, subframe, resource, resource block, region, band, subband, control channel, data channel, synchronization signal, various reference signals, various signals, and various messages related to new radio (NR) may be interpreted in various meanings as currently used or to be used in the future.

LTE Relay Technology

In LTE technology, relay technology has been used for expanding cell coverage via use of additional network nodes, called relay nodes (RNs). The LTE RN performs relaying for user plane data and control plane data at the IP packet level. Further, services are provided via only one RN between the UE and the donor base station (donor eNB, DeNB) which is the base station serving the relay node. That is, single-hop relaying only is supported between the UE and the DeNB.

FIG. 7 is a view illustrating an exemplary relay-based user plane protocol structure in LTE technology.

Referring to FIG. 7, a UE 700 communicates with a donor base station 720 via a relay node 710. The donor base station 720 transfers data from the UE 700 to a gateway 730. The UE 700 is composed of an L1 physical layer, an L2 layer, an IP layer, a TCP/UDP layer, and an App. layer. The relay node 710 is connected with the UE 700 via the L1 and L2 layers and is connected with the donor base station 720 via a GTP-u layer over the IP layer, transmitting and receiving data. To that end, the relay protocol in LTE technology is configured as shown in FIG. 7.

FIG. 8 is a view illustrating a relay node (RN) startup procedure in LTE technology.

An RN startup procedure of FIGS. 8A and 8B is for starting the RN operation in LTE relay technology. The RN startup procedure is performed to configure parameters necessary for the RN.

Referring to FIGS. 8A and 8B, after an RN 800 is powered on (S805), the RN 800 performs a two-phase startup procedure. When the RN 800 powers on, two phases are provided because it is not known what cell the RN 800 is allowed to network-register (attach). Since all base stations are not supported to serve the RN 800, the RN 800 needs to identify what cell supports the operation of the RN 800. If the RN 800 is already aware of the attachable cells, phase I may be skipped and phase II may be immediately performed.

Referring to FIG. 8A, phase I is described below.

Phase I Attach for RN preconfiguration.

Upon power-up, the RN 800 (e.g., UE) attaches to the E-UTRAN/EPC (S815) and searches for initial configuration parameters including a list of DeNB cells from an RN OAM 850 (S825). After operation S825 is completed, the RN 800 is detached from the network (S835) and triggers phase II described below. The MME 820, as a normal UE, performs selection on an S_GW and a P-GW 830 for the RN 800. (The RN attaches to the E-UTRAN/EPC as a UE at power-up and retrieves initial configuration parameters, including the list of DeNB cells, from RN OAM. After this operation is complete, the RN detaches from the network as a UE and triggers Phase II. The MME performs the S-GW and P-GW selection for the RN as a normal UE.)

Referring to FIG. 8B, phase II is described below.

Phase II Attach for RN operation.

Referring to FIG. 8B, the RN 800 performs connection to a DeNB 810 selected from the list gathered in phase I to start relay operations (S806).

If the DeNB 810 starts a bearer configuration for S1/X2, the RN 800 starts an S1 and X2 connection configuration with the DeNB 810. Further, the DeNB 810 initiates an RN reconfiguration procedure via RRC signaling on an RN-specific parameter (S807). (The RN connects to a DeNB selected from the list acquired during Phase I to start relay operations. After the DeNB initiates setup of bearer for S1/X2, the RN initiates the setup of S1 and X2 associations with the DeNB. In addition, the DeNB may initiate an RN reconfiguration procedure via RRC signaling for RN-specific parameters.)

After performing an S1 setup with the RN 800 (S808), the DeNB 810 performs an S1 eNB configuration update procedure when the configuration data is updated by RN connection (S809). Further, after performing an X2 setup with the RN 800 (S811), the DeNB 810 performs an X2 eNB configuration update procedure and updates cell information (S812). (After the S1 setup, the DeNB performs the S eNB Configuration Update procedure(s), if the configuration data for the DeNB is updated due to the RN attach. After the X2 setup, the DeNB performs the X2 eNB Configuration Update procedure(s) to update the cell information). In Phase II, the ECGIs of the RN cell are configured by RN OAM (In this phase the RN cells' ECGIs are configured by RN OAM).

If phase II is completed, the RN 800, as a relay, starts its operation (S813).

As such, in the typical LTE relay technology, the RN supports only single-hop relaying, and most of the relay configuration is provided via static OAM. From the UE's point of view, the RN plays a role as a base station, and the RN recognizes the donor base station as a core network entity and configures a UE context in the RN. Thus, most of the RN configuration is made by being instructed via OAM and, in the entire RN device, only a specific radio configuration (e.g., RN subframe configuration) is instructed by the determination of the donor base station 720 and is configured. Thus, if multiple hops are supported between the UE and the base station (donor base station), it is difficult to efficiently configure according to the service requirements per UE. Upon attempting to support multiple hop relays via the typical LTE technology, it is impossible to separately process data via a plurality of relay nodes. Further, over-IP layer signaling and data processing may increase latency.

High Layer Functional Split

The next-generation radio access network (hereinafter, referred to as NR, 5G, or NG-RAN for ease of description) may be provides separately into concentrated nodes (hereinafter, denoted central units (CUs) for ease of description) and distributed nodes (hereinafter, denoted distributed units (DUs) for ease of description) to support efficient network buildups. That is, a base station may be separated into a CU and a DU from a logical or physical point of view. The base station as used herein refers to a base station adopting NR technology and, to be distinguished from LTE base station (eNB), may be denoted a gNB. Further, unless stated otherwise, NR technology may be applied to base stations, donor base stations, and relay nodes.

The CU is a logical node hosting RRC, SDAP, and PDCP protocol. Or, the CU means a logical node hosting RRC and higher layer L2 protocol (PDCP). The CU controls the operation of one or more DUs. The CU terminates the F1 interface connected with DU. (gNB Central Unit (gNB-CU), a logical node hosting RRC, SDAP and PDCP protocols, and controls the operation of one or more gNB-DUs. The gNB-CU also terminates F1 interface connected with the gNB-DU.)

The DU is a logical node hosting RLC, MAC, and PHY layer. The operation of DU is partially controlled by the CU. One DU supports one or more cells. One cell is supported by only one DU. The DU terminates the F1 interface connected with CU. (gNB Distributed Unit (gNB-DU), a logical node hosting RLC, MAC and PHY layers, and its operation is partly controlled by gNB-CU. One gNB-DU supports one or multiple cells. One cell is supported by only one gNB-DU. The gNB-DU terminates F1 interface connected with the gNB-CU.)

The NG-RAN consists of a set of gNBs connected to the 5GC through the NG.

The gNBs can be interconnected through the Xn. A gNB may include a gNB-CU and gNB-DUs. A gNB-CU and a gNB-DU is connected via F1 logical interface. One gNB-DU is connected to only one gNB-CU. For NG-RAN, the NG and Xn-C interfaces for a gNB consisting of a gNB-CU and gNB-DUs, terminate in the gNB-CU.

As such, the F1 interface is an interface for providing mutual access between CU and DU and uses an F1AP (The F1 Application Protocol) to provide a signaling procedure on the corresponding interface.

For EN-DC, the S1-U and X2-C interfaces for a gNB including a gNB-CU and gNB-DUs, terminate in the gNB- CU. The gNB-CU and connected gNB-DUs are only visible to other gNBs and the 5GC as a gNB.

New Radio (NR)-Based Relay

The 3GPP has been conducting initial standardization for 5G radio communication technology (NR) to meet various requirements from technology development. NR which is able to use high-frequency bands uses a wider bandwidth and multi-beam system as compared with LTE and may have more utility for relay technology. Thus, the operator may more easily build up a dense network of self-backhauled NR cells. However, the mmWave band may have the drawback of being likely to experience severe short-term blocking. Small coverage and beam operation of the mmWave band may need connection to the base station connected wiredly/via optical fiber through a multi-hop relay. In this case, the typical LTE-based relay technology cannot connect the UE to the base station connected wiredly/via optical fiber. In particular, the multi-hop relay needs to process data in multiple hops and may thus be difficult to use upon 5G service transmission which is sensitive to delay. Thus, research is required for various protocol structures to meet the quality for each service in multiple hops, but no detailed technology therefor has been yet proposed.

The present disclosure introduces an NR relay structure capable of configuring a plurality of hop relays to thereby separately process data for the requirements per UE or per service in an effective manner. Also the present disclosure introduces a specific procedure and device for connecting the UE to the base station via multi-hop relay nodes in an NR relay structure.

Embodiments described below may be practiced individually or in combination. For ease of description, the description focuses primarily on the case where NR access to the NR UE is relayed to the NR base station (donor base station) via NR-based radio self-backhauling. However, this is merely an example for description, and each embodiment described below may also be applied where LTE access to the LTE UE is relayed to the LTE base station (donor base station) via NR-based radio self-backhauling.

In the disclosure, a donor base station denotes a radio network node (or base station, gNB, or part of gNB) that terminates the interface (NG interface, e.g., N2, or N3 interface) for the core network. The donor base station may be physically connected to the core network or other base stations wiredly/via optical fiber. Further, the donor base station may configure a backhaul with other NR nodes, e.g., base stations, CUs, DUs, and core network nodes (e.g., AMF or UPF), using NR radio technology. The donor base station may include one CU and one or more DUs, as does the NR base station. The term "donor base station" may be replaced with other terms, such as IAB-DN, DgNB, DN, or Donor base station.

Meanwhile, an integrated access and backhaul (IAB) node means a node that supports access to UE and radio self-backhauling using NR radio technology. The IAB node may configure a backhaul to other NR node using NR radio technology. Further, the IAB node may physically not connect to other NR node wiredly/via optical fiber. The term "IAB node" may be replaced with other terms, such as NR-RN, NR relay, or integrated node. In the following description, it is termed a relay node or IAB node.

The Un interface refers to an interface between IAB nodes or between the IAB node and the donor base station. The term "Un interface" may be replaced with other terms, such as IAB backhaul interface, U-IAB interface, or Ui interface.

When the UE accesses the donor base station via the multi-hop IAB node, the IAB nodes should be able to effectively separate, process and transfer user data traffic between the UE and the donor base station. As an example, the IAB node should be able to determine a next hop and transfer corresponding uplink data to the next hop to be able to separately transfer the uplink data belonging to a specific radio bearer, received from a specific UE, to the donor base station. As another example, the IAB node should be able to determine a next hop and transfer corresponding downlink data to the next hop to be able to separately process/transfer the downlink data belonging to a specific radio bearer of a specific UE, received from a specific donor base station, to the UE.

To implement such operations, the multi-hop IAB node and the donor base station should perform RRC connection configuration. That is, similar to the RN startup procedure described above in connection with FIG. 8, the IAB node may perform a procedure for configuring parameters necessary for the IAB node to start IAB node operations.

FIG. 9 is a view illustrating an RRC connection configuration procedure using a relay node according to an embodiment.

The procedure described in connection with FIG. 9 may be applied to various protocol structures described below. In connection with FIG. 9, the description focuses primarily on the case where the UE and the donor base station transmit and receive data via two hops (e.g., IAB 1 and IAB 2) for ease of description. This is merely for ease of description, and the same may also be applied where any number of IAB nodes are included.

Referring to FIG. 9, the donor base station 903 performs a connection setup operation with the IAB node (IAB 2) 902 directly connected via the radio interface (S910). If the connection setup operation is completed, the donor base station 903 performs a connection setup operation with another IAB node (IAB 1) 901 (S915).

The UE 900 transmits a random access preamble to the IAB 1 node 901, initiating a random access operation to the IAB 1 node 901 (S920). The IAB 1 node 901 includes a response to the random access preamble in a random access response message and transmits the same to the UE 900 (S925). The UE 900 transmits an RRC connection request message, initiating an RRC connection configuration procedure with the donor base station 903 (S930). The donor base station 903 configures a signaling radio bearer for transmission of a control message of the UE 900 or the IAB 1 node 901 or the IAB 2 node 902 on the backhaul interface between the IAB 2 node 902 and the donor base station 903 via an RRC connection reconfiguration procedure with the IAB 2 node 902 (S935). Further, the donor base station 903 configures a signaling radio bearer for transmission of a control message of the UE 900 or the IAB 1 node 901 on the interface between the IAB 1 node 901 and the donor base station 903 via an RRC connection reconfiguration procedure with the IAB 1 node 901 (S935).

The donor base station 903 sets up an RRC connection to the UE 900 by transmitting an RRC connection setup message to the UE 900 (S945). The UE 900 sets up an RRC connection with the donor base station 903 using the received RRC connection setup message and transmits an RRC connection setup complete message to the donor base station 903 via the IAB 1 node 901 and/or the IAB 2 node 902 (S950).

If the RRC connection setup with the UE 900 is completed, the donor base station 903 performs signaling with a core network entity (S955). Accordingly, it receives PDU session ID, S-NSSAI, QFI (QoS flow Indicator), QFI-associated QoS profile information to be configured in the UE 900 from the core network entity. Thereafter, the donor base station 903 performs a radio resource configuration procedure for separately relaying data radio bearers for the IAB 1 node 901, the IAB 2 node 902, and the UE 900 (S965 and S970). The donor base station 903 transmits an RRC connection reconfiguration message, configuring a radio resource in the UE 900 (S970). The UE 900 transmits an RRC connection reconfiguration complete message, providing an acknowledgement for radio resource configuration (S975).

As described above, the UE and the donor base station configure an RRC connection and radio resources (radio bearers) via the relay node (IAB node).

Each step of FIG. 9 is described below stepwise and in greater detail.

Connection Setup of the IAB Node (IAB 2) Directly Connected with the Donor Base Station Via the Radio Interface If the IAB node is directly connected with the donor base station via the radio interface, the IAB node may configure an RRC connection to the donor base station and perform network registration. For example, if the IAB node selects the cell provided by the donor base station and is connected to the donor base station via the cell, the IAB node may configure an RRC connection to the donor base station and perform network registration. The IAB node may extract initial configuration parameters including the donor base station cell list from the (IAB) OAM for preconfiguration of the IAB node. Thereafter, for IAB operation, the IAB node may select the cell with the best radio quality from among the cells included in the donor base station cell list, configure an RRC connection via the cell, and perform an IAB node operation.

As an example, the IAB node and the cells of the IAB node may be configured by IAB OAM. The IAB node and IAB node cell configuration may be performed together with extracting the initial configuration parameters including the donor base station cell list or may be performed in phase II during which it, as an IAB node, performs network registration. Alternatively, it may be preconfigured in the IAB node.

As an example, the radio resource configuration for the IAB node and IAB node cells may be made by being instructed by the donor base station. The radio resource configuration operation may be performed in phase I during which the IAB node, as a UE, performs network registration. Or, the radio resource configuration operation may be performed in phase II during which it, as an IAB node, performs network registration. Or, the radio resource configuration operation may be performed and configuration when triggered by the donor base station. If the NR-based IAB node supports multi-hop topology, the donor base station may control the radio resources of the IAB node for efficient radio resource control. By so doing, when the UE accesses the donor base station and transmits/receives data, the IAB nodes may effectively separate and process/transfer user data traffic between the UE and the donor base station according to the QoS parameters.

As another example, the IAB node transmits a request message for setting up an interface between the IAB node and the donor base station to the donor base station. For ease of description, an F3 interface denotes the interface between the IAB node and the donor base station. However, the present embodiments are not limited thereto. For example, the F3 interface may be replaced with another term. The F3 interface may denote the interface between the donor base station and the access IAB node (e.g., first hop IAB node) serving the UE. Where the donor base station is split into CU and DU, the F3 interface may indicate the interface between the donor base station DU and the access IAB node serving the UE or the interface between the donor base station CU and the access IAB node serving the UE.

Similar to the F1 application protocol (F1AP) of the F1 interface which is the interface between CU and DU, there may be provided a higher layer protocol to provide a signaling procedure between the IAB node and the donor base station on the F3 interface. For ease of description, such a higher layer protocol is referred to as an F3 application protocol (F3AP). For example, the above-described setup request message for the interface between the IAB node and the donor base station denotes an F3AP message used to exchange data of the application level necessary for the IAB node and donor base station to correctly operate on the F3 interface.

The F3 interface setup request message includes a cell list configured in the IAB node. Or, the F3 interface setup request message may include a cell list configured in the IAB node and having been ready to be activated or a candidate cell list that may be configured/activated. The F3 interface setup request message may be included and transmitted in an uplink RRC message. As an example, the uplink RRC message may be an RRC setup complete message, a UL information transfer message, or a UE assistant information message.

The donor base station may ensure connectivity to the core network. For such a reason, the donor base station may perform an NG setup or gNB configuration update procedure with the 5G core network (5GC).

The donor base station transmits an F3 interface setup response message between the IAB node and the donor base station to the IAB node. The F3 interface setup response message may include a cell list to be configured in the IAB node. Or, the F3 interface setup response message may include a cell list to be activated of the cell list to be activated in the IAB node or a candidate cell list. The F3 interface setup response message may be included and transmitted in a downlink RRC message. As an example, the downlink RRC message may be an RRC connection reconfiguration message or DL information transfer message. If the IAB node succeeds in activating the cell, the activated cell is operated.

2) Connection Setup of the IAB Node (IAB 1) Connected Via the Radio Interface Provided by Another IAB Node (e.g., IAB 2)

If the IAB node connects to the donor base station via another IAB node, the IAB node may configure an RRC connection to the donor base station via the other IAB node and perform network registration. For example, if the IAB node selects a cell (e.g., activated cell) provided by the other IAB node and connects to the donor base station via another IAB node, the IAB node may configure an RRC connection to the donor base station via the other IAB node and perform network registration.

As an example, for preconfiguration of the IAB node connected to the donor base station via the other IAB node, the IAB node may extract initial configuration parameters including the cell list of the other IAB node than the donor base station cell list from the IAB OAM. Or, the IAB node may extract the initial configuration parameters including the cell list of the other IAB node except for the donor base station cell list from the IAB OAM. Alternatively, the IAB node may extract the initial configuration parameters including at least one of a donor base station cell list, a cell list of the other IAB node, an activated cell list of the other IAB node, a cell list of an adjacent IAB node, an activated cell list of the adjacent IAB node, a cell list of a neighbor IAB node, a neighbor cell list, and an neighbor cell list associated with the IAB node, from the IAB OAM.

Thereafter, for IAB operation, the IAB node may select the cell with the best radio quality from among the cells included in the received cell list, configure an RRC connection via the cell, and perform an IAB node operation.

As another example, the donor base station may indicate/configure preconfiguration information or configuration information for the IAB node connected to the donor base station, to the IAB node through an RRC message, via the other IAB node. For example, the preconfiguration information or configuration information may include at least one information of a donor base station cell list, a cell list of the other IAB node, an activated cell list of the other IAB node, a cell list of an adjacent IAB node, an activated cell list of the adjacent IAB node, a cell list of a neighbor IAB node, a neighbor cell list, and an neighbor cell list associated with the IAB node. The above-described RRC message may be included in an RRC connection release message or RRC connection reconfiguration message. The donor base station may release the RRC connection of the IAB node. Thereafter, for IAB operation, the IAB node (or UE) may select the cell with the best radio quality from among the cells included in the received cell list, configure an RRC connection via the cell, and perform an IAB node operation.

If the IAB node performs the same cell selection/reselection operation as a normal UE in the idle mode, it would have a high chance that the cell with the best radio quality may be selected/reselected, or the cell with the best radio quality on the priority frequency may be selected/reselected. However, to efficiently perform a relaying operation, it may be preferable to consider whether the selected/reselected cell is a cell the donor base station provides or the number of hops to the donor base station.

To that end, as an example, in selecting/reselecting a cell included in the received cell list, the IAB node may select/reselect a cell considering whether each cell is provided by the donor base station or the number of hops to the donor base station. Specifically, upon performing the operation for cell selection/reselection, the IAB node may consider (adding or subtracting), as a cell selection criterion (or cell reselection criterion/cell ranking criterion), including one or more of information for indicating whether the corresponding cell is a cell provided by the donor base station or the adjustment parameter/offset/scaling value according to the number of hops to the donor base station. The parameters additionally applied to the above-described cell selection criteria may be applied to one of the following cell selection/cell reselection criterion parameters and be used.

The following equations represent example cell selection criterion values.

$$Srxlev = Q_{rxlevmeas} - (Q_{rxlevmin} + Q_{rxlevminoffset}) - Pcompensation - Qoffset_{temp}$$

$$Squal = Q_{qualmeas} - (Q_{qualmin} + Q_{qualminoffset}) - Qoffset_{temp}$$

The following table shows values of each parameter in the above equations. Further, $Qoffset_{temp}$ means the offset parameter applicable as necessary. In the present disclosure, additional parameters may be applied to the above equations. In this case, such parameter may be added or subtracted from the above-described equations.

| | |
|---|---|
| Srxlev | Cell selection RX level value (dB) |
| Squal | Cell selection quality value (dB) |
| $Q_{rxlevmeas}$ | Measured cell RX revel value (RSRP) |
| $Q_{qualmeas}$ | Measured cell quality value (RSRQ) |
| $Q_{rxlevmin}$ | Minimum required RX level in the cell (dBm) |
| $Q_{qualmin}$, | Minimum required quality level in the cell (dB) |
| $Q_{rxlevminoffset}$ | OffSet to the signalled $Q_{rxlemin}$ taken into account in the Srxlev evaluation as a result of a periodic search for a higher priority PLMN while camped normally in a VPLMN [5] |
| $Q_{qualminoffset}$ | OffSet to the signalled $Q_{qualmin}$ taken into account in the Squal evaluation as a result of a periodic search for a higher priority PLMN while camped normally in a VPLMN [5] |
| Pcompensation | $max(P_{EMAX} - P_{PowerClass}, 0)$ (dB) |
| $P_{EMAX}$ | Maximum TX power level an UE may use when transmitting on the uplink in the cell (dBm) defined as $P_{EMAX}$ in [TS 36.101] |
| $P_{PowerClass}$ | Maximum RF output power of the UE (dBm) according to the UE power class as defined in [TS 36.101] |

Meanwhile, one or more information of the above-described donor base station cell list, cell list of the other IAB node, parameters (e.g., information for indicating whether it is a cell provided by the donor base station, information for indicating the number of hops to the donor base station, and additional parameters) for IAB node cell selection/cell reselection, and initial configuration parameters of the IAB node may be broadcast via system information for the cell where the IAB node is provided or the cell provided by the donor base station.

Alternatively, one or more information of the above-described donor base station cell list, cell list of the other IAB node, parameters (e.g., information for indicating whether it is a cell provided by the donor base station, information for indicating the number of hops to the donor base station, and additional parameters) for IAB node cell selection/cell reselection, and initial configuration parameters of the IAB node may be provided via additional system information/on demand system information.

Specifically, in NR, the minimum system information which is broadcast at fixed cycles and always receivable by the UE is distinct from other system information (RMSI). The minimum system information includes basic information necessary for initial access and being broadcast at fixed cycles and may be divided into the master information block transmitted on the BCH and system information block type 1 transmitted on the DL-SCH. In contrast, the other system information RMSI provides the period and scheduling information broadcast by the system information block type 1. Information for the donor base station provided for the IAB node may not be essential minimum system information. Thus, the UE may obtain the other system information RMSI in an on-demand manner based on the minimum system information. As an example, during performing random access, the other system information may be received. As another example, the other system information may be received during configuring RRC connection.

Or, one or more information of the above-described donor base station cell list, cell list of the other IAB node, parameters (e.g., information for indicating whether it is a cell provided by the donor base station, information for indicating the number of hops to the donor base station, and additional parameters) for IAB node cell selection/cell reselection, and initial configuration parameters of the IAB node may be transmitted to the IAB node via a dedicated RRC message by the donor base station. For example, the dedicated RRC message transmitted by the base station may be an RRC connection release message or RRC connection reconfiguration message.

Alternatively, one or more information of the above-described donor base station cell list, cell list of the other IAB node, parameters (e.g., information for indicating whether it is a cell provided by the donor base station, information for indicating the number of hops to the donor base station, and additional parameters) for IAB node cell selection/cell reselection, and initial configuration parameters of the IAB node may be transmitted to the IAB node via an F3AP message by the donor base station.

Further, the above-described donor base station cell list, cell list of the other IAB node, and parameters for cell selection/cell reselection by the IAB node may be used to perform cell selection/reselection/link selection for restoring connection to the donor base station by the IAB node when the IAB node experiences a radio link failure (e.g., when the IAB node in connected state detects a failure in radio link to the higher IAB node). For example, if the IAB node detects a radio link failure, the IAB node reconfigures a connection to the donor base station via another cell. Such procedure may be provided via a normal cell selection procedure and cell selection may be performed among the cells provided via a replacement path preconfigured by the donor base station. The donor base station may configure information to be reconfigured earlier than others to support quick restoration in the IAB node when any IAB node detects a radio link failure via the RRC dedicated message. The information may include one or more information of priority cell, priority cell list, priority frequency, reconfiguration candidate cell, reconfiguration candidate cell list, donor base station cell list, cell list of other IAB node, and number of hops to the donor base station for each cell. Upon detecting a radio link failure to the donor base station or higher IAB node, the IAB node reconfigures a connection to the donor base station using the information. As an example, the IAB node may perform cell selection first from among the indicated cells. As another example, the IAB node may identify the physical cell identifier of each cell via the broadcast system information and select the indicated cell. If the radio link of the IAB node is reconfigured, the number of hops to the donor base station of the other IAB node connected to the IAB node is varied. The donor base station transfers information for modifying the number of hops to the donor base station of the cell received by each IAB node or each IAB node to each IAB node, and the corresponding IAB node receives the same, varies the corresponding information, and stores the same. The corresponding information may be indicated from the donor base station to the IAB node via an RRC message or F3AP message.

Meanwhile, the UE may first perform cell selection/cell reselection on a cell based on the above-described parameters, such as the information for indicating whether the cell is a cell provided by the donor base station or the information for indicating the number of connection hops to the donor base station.

3) Random Access Preamble Transmission

Where the UE in idle state selects a cell associated with the IAB 1 node according to the cell selection/cell reselection criteria, if the UE attempts network access (e.g., the idle UE triggers transmission of transmit data), the UE initiates a random access procedure to the IAB 1 node. The MAC entity of the UE transmits a random access preamble to the IAB 1 node. That is, the UE recognizes the IAB 1 node as a base station and transmits a random access preamble.

4) Random Access Response

After the UE has transmitted a contention-based random access preamble, the UE starts a random access response window at the beginning of the first PDCCH occasion after fixed specific symbol duration from the end of the preamble transmission. While the random access response window operates, the UE monitors the PDCCH for the random access response identified by the RA-RNTI. Upon receiving the random access response message identified by the RA-RNTI while monitoring PDCCH, the UE performs the remaining random access procedure using the response message.

5) RRC Connection Request Message Transmission

The UE transmits an RRC connection request message to the IAB 1 node.

The IAB 1 node transmits the RRC connection request message to the donor base station via the IAB 2 node.

As an example, the IAB 1 node may include the RRC connection request message in an uplink RRC message and transmit the same. As an example, the IAB 1 node may transmit the RRC connection request message via a signaling radio bearer (e.g., a signaling radio bearer configured for SRB0 or SRB1/SRB2 configured for any signaling radio bearer). The RRC connection request message may be included in an F3AP message transmitted to the donor base station via the F3 interface by the IAB 1 node and transmitted via the signaling radio bearer. To that end, the F3AP message may be an application level message for uplink RRC message transmission. As another example, the F3AP message transmitted by the IAB 1 node to the donor base station via the F3 interface may include one or more information of signaling bearer types (e.g., SRB0, SRB1, or SRB2) and the UE identifier in addition to the RRC connection request message. As an example, the message transmitted to the donor base station by the IAB 1 node may include the C-RNTI. Alternatively, the UE identifier may be one or more information of the valid C-RNIT transmitted to the IAB 1 node by the UE, the RA-RNTI included when the UE transmits the random access preamble for contention-based random access, the temporary C-RNTI allocated via a random access response message by IAB 1, RA-RNTI information identified via the random access response message by IAB 1, and the UE's C-RNTI. Accordingly, the donor base station may obtain the C-RNTI allocated by the UE's access IAB node and uniquely identify the UE along with the IAB node information and/or cell identification information and control the radio resources. As another example, the UE identifier may be the I-RNTI allocated by the IAB 1 node. The I-RNTI may uniquely identify the UE context of the UE as identification information for identifying the UE in the inactive state. As another example, a new UE identifier (marked "IAB-RNTI" for ease of description) for uniquely identifying the received UE by the donor base station may be transmitted to the donor base station by the IAB 1 node. The donor base station may uniquely identify the UE via the IAB-RNTI and the IAB node information. As another example, the message transmitted from the IAB 1 node to the donor base station may include IAB UE F3AP ID for uniquely identifying UE association via the F3 interface.

In contention-based random access, the UE selects the random access preamble. Thus, there is the likelihood that one or more UEs simultaneously transmit the same random access preamble. In such a case, it may be not enough to perform identification only by the base station having received the random access preamble. Accordingly, it is necessary to have an additional contention resolving step. To that end, the IAB node or donor base station may indicate what UE transmission has been actually received to the UE.

Upon transmitting the MAC PDU via the uplink radio resource allocated by the random access response, the UE includes the UE identification information in the MAC PDU. If the UE has a valid C-RNTI, C-RNTI MAC CE is included in the MAC PDU. For example, the C-RNTI is included in message 3 (MSG3). The IAB 1 node may include the C-RNTI upon transmitting an RRC connection request message to the donor base station to support centralized control for the radio resources of the connected IAB nodes. Unless the UE has a valid C-RNTI, a CCCH SDU including the UE's identification information is included in the MAC PDU, e.g., when the CCCH message (RRC connection request message) is transmitted.

Thereafter, when the UE detects the C-RNTI via the PDCCH or if the UE receives the same UE contention resolution identity MAC CEL as the CCCH SDU transmitted before, the UE considers the random access procedure as succeeding.

To that end, as an example, the IAB 1 node stores/buffers/retains/maintains the RRC connection request message (CCCH-SDU) until receiving the RRC connection setup message from the donor base station.

As another example, the IAB 1 node may receive the RRC connection request message (CCCH SDU) along with the RRC connection setup message from the donor base station.

As another example, the donor base station stores the UE's C-RNTI, as a temporary C-RNTI, as the UE context. Thereafter, upon receiving the RRC connection setup complete message from the UE, the temporary C-RNTI value is set as the C-RNTI.

As another example, the IAB 1 node stores/buffers/retains/maintains the C-RNTI received from the UE. Thereafter, upon receiving the RRC connection setup message from the donor base station, the temporary C-RNTI value is set as the C-RNTI. Upon receiving the RRC connection setup complete message from the UE, the temporary C-RNTI value is set as the C-RNTI.

6) To 7) Configuration of Signaling Radio Bearer for Transmission of Control Message of the UE or IAB Node in IAB 1 Node/IAB 2 Node The donor base station may configure SRB1 for the UE which has transmitted the RRC connection request message to the IAB 1 node/IAB 2 node, and the donor base station may transmit data (RRC message) between the donor base station and the UE via the signaling radio bearer. To that end, the donor base station may configure configuration information necessary for the IAB 1 node/IAB 2 node in the IAB 1 node/IAB 2 node.

For example, the configuration information may include mapping information for mapping data per signaling radio bearer of each UE to the radio bearer/radio link control (RLC) bearer between the interfaces and transmitting the same.

As an example, the donor base station may configure SRB1 between the donor base station and the IAB 1 node for transmission of the F3AP message of the IAB 1 node and the RRC message of the UE to the IAB 1 node which is the UE's access IAB node and transmit the UE's RRC message and the F3AP message of the IAB 1 node to the donor base station via the signaling radio bearer. As another example, the donor base station may configure SRB1 between the donor base station and the IAB 2 node for transmitting the F3AP message of the IAB 2 node and for transmitting the RRC message of the IAB 1 node to the IAB 2 node which is the IAB 1 node's access IAB node and transmit the IAB 1 node's RRC message and the F3AP message of the IAB 2 node to the donor base station via the signaling radio bearer. As another example, the donor base station may transmit an RRC message or F3AP message, including mapping information for mapping the RRC message of the UE to SRB1 between the IAB 1 node and the donor base station and transmitting the same, to the IAB 1 node, which is the UE's access IAB node, via the signaling radio bearer. As another example, the donor base station may transmit an RRC message or F3AP message including the mapping information between the lead-out RLC channel transmitted to the donor base station and the lead-in RLC channel including the UE's RRC message received from the IAB 1 node to the IAB 2 node which is the access IAB node of the IAB 1 node. Thus, it is possible to transmit each UE's RRC message separately between the IAB 1 node and the IAB 2 node and between the IAB 2 node and the donor base station.

As necessary, step 6 and step 7 may be performed simultaneously with, or after step 8.

8) Transmission of RRC Connection Setup Message from Donor Base Station to UE

The donor base station transmits the RRC connection setup message to the UE via the IAB 2 node and IAB 1 node. The RRC connection setup message transmitted to the UE by the donor base station may be transmitted to the IAB 1 node or IAB 2 node via the SRB. The RRC connection setup message may be included in the F3AP control message between the donor base station and the IAB 1 node and be transmitted to the IAB 1 node via the SRB.

9) Transmission of RRC Connection Setup Complete Message from UE to Donor Base Station Via IAB 1 Node If the CCCH SDU is included in MSG3, if PDCCH transmission has been addressed by the UE's temporary C-RNTI, if the MAC packet data unit (PDU) has been successfully decoded, and if the UE contention resolution identity in the MAC CE matches the CCCH SDU transmitted in MSG3, the UE considers the contention resolution as successful. The UE sets the temporary C-RNTI as the C-RNTI.

The UE transmits an RRC connection setup complete message to the donor base station via the IAB 1 node. The RRC connection setup complete message may be transmitted from the IAB 1 node to the IAB 2 node or donor base station via the SRB. In this case, the RRC connection setup complete message may be included in the F3AP message and be transmitted via the SRB.

Meanwhile, if the UE identifier is used as the C-RNTI (16 bits), the chance of collision is very low. Thus, the C-RNTI allocated by the IAB 1 node may be used as an example of the above-described UE identifier. However, there is also the possibility that the duplicated/collided/contended C-RNTI is used in the cells provided by multiple IAB nodes received in the donor base station. To prevent collision, the node identifier may be used along with the UE identifier allocated by the IAB 1 node or the C-RNTI as the UE identifier. The node identifier may be allocated when the IAB node configures a connection to the donor node/attempts access. The node identifier may be allocated to the IAB node via the RRC message by the donor base station.

When the UE accesses the donor base station via the multi-hop IAB node, the IAB nodes should be able to effectively separate, process and transfer user data traffic between the UE and the donor base station. As an example, the IAB node is required to be able to determine a next hop to be able to transfer the uplink data belonging to a specific radio bearer received from a specific UE to the donor base station and forward the data to the next hop.

As another example, the IAB node is required to be able to determine a next hop to be able to separately process/transfer the downlink data belonging to a specific radio bearer received from a specific donor base station to the UE and forward the data to the next hop.

10) Core Network Signaling

The donor base station performs signaling with the core network entity if the RRC connection configuration with the UE is completed. For example, the donor base station sends an NGAP initial UE message to the core network via the NG interface between base station and AMF to thereby receive the initial UE context setup message and performs a core network signaling procedure, such as configuring a UE context. By so doing, it receives PDU session ID, S-NSSAI, QFI (QoS flow Indicator), QFI-associated QoS profile information to be configured in the UE 900 from the core network entity. For this, one of any signaling messages set forth in the 3GPP TS 38.413 NGAP protocol may be used.

11) To 12) Configuration of Data Radio Bearer for UE in IAB 1 Node/IAB 2 Node

In configuring the data radio bearer (DRB) with the UE and transmitting and receiving data, the donor base station may configure configuration information necessary for the IAB 1 node/IAB 2 node in the IAB 1 node/IAB 2 node. The UE is the UE which has transmitted the RRC connection request message and transmits/receives data with the donor base station via the configured DRB.

To that end, the configuration information configured in the IAB 1 node and/or the IAB 2 node may include mapping information for mapping data per data radio bearer of each UE to the radio bearer/RLC bearer between the interfaces and transmitting the same. For example, there may be included mapping information for mapping the data per data radio bearer for each UE to the interface between the IAB 1 node and the IAB 2 node and the interface between the IAB 2 node and the donor base station and transmitting the same. The information may be indicated to the IAB node via the F3AP message between the donor base station and the IAB node.

Steps 11 and 12 may be performed simultaneously with, or after, step 13.

13) To 14) Configuration of Radio Resource in UE Via RRC Connection Reconfiguration Procedure The donor base station configures radio resources (e.g., radio bearer configuration) in the UE via the RRC connection reconfiguration message. The UE sends an acknowledgement message in response thereto.

As described above, the UE, IAB nodes, and the donor base station configure a controller via a relay operation and transmit and receive RRC messages.

The operation of transferring the UE's RRC message to the donor base station by the relay node (IAB node) is described below in greater detail. For example, the RRC message transmitted by the UE may be transferred to the donor base station via the signaling radio bearer or may be included in an F3AP message and be transmitted. In the present embodiment, the description focuses primarily on uplink RRC messages but may also be applicable to downlink RRC messages. Further, in the following description, as the relay node, the above-described IAB node is described, but embodiments of the disclosure are not limited thereto.

Figure 10:
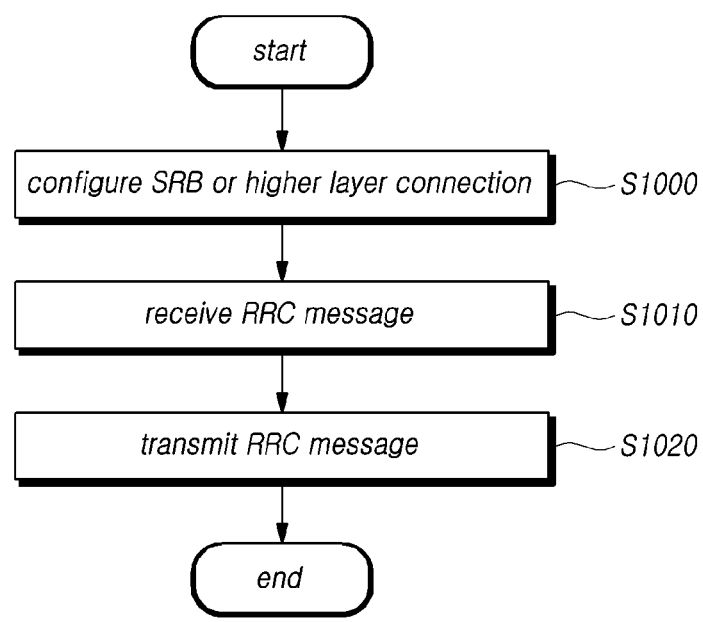
FIG. 10 is a flowchart illustrating the operation of transferring an RRC message by a relay node according to an embodiment.

FIG. 10 is a flowchart illustrating the operation of transferring an RRC message by a relay node according to an embodiment.

Referring to FIG. 10, the relay node may perform configuring a signaling radio bearer or higher layer protocol connection with the donor base station in a method of processing an RRC message (S1000). The relay node may configure a connection with the donor base station and configure a signaling radio bearer. Alternatively, the relay node may configure a higher layer protocol connection with the donor base station. As an example, the higher layer protocol connection may be referred to as an F3 application protocol (F3AP).

For example, a relay node denotes an integrated access and backhaul (IAB) node that is connected with the UE via radio access and is connected with another relay node or donor base station via radio backhaul. Or, the relay node may mean an IAB node connected with another relay node or donor base station via radio backhaul. In other words, the relay node may be an IAB node performing direct connection via radio access with the UE or may be an IAB node that is positioned in the middle of the relay path or on a side surface of the donor base station and is not directly connected with the UE.

The relay node may receive mapping information from the donor base station to configure a signaling radio bearer or higher layer protocol connection. For example, the relay node may configure a connection using the mapping information between the backhaul RLC channel and the UE's logical channel identification information received from the donor base station.

The configured signaling radio bearer is ciphered by the PDCP entity of the donor base station and the PDCP entity of the relay node.

Meanwhile, the relay node may perform receiving the RRC message transmitted from the UE (S1010). For example, the relay node receives the RRC message via radio access with the UE.

The relay node may perform transmitting the RRC message to the donor base station or another relay node using the signaling radio bearer or higher layer protocol (S1020). For example, the relay node may add the address information for the donor base station to the F3AP message including the RRC message and transmit the same, by the adaptation entity of the relay node. Here, the address information for the donor base station may mean a GPRS tunneling protocol (GTP) tunnel endpoint identifier (TEID) or a donor base station IP address received from the donor base station.

Further, the RRC message received from the UE may be added to the payload of the F3AP message and be transmitted via the signaling radio bearer. Besides, the F3AP message may further include at least one of UE identification information and signaling radio bearer identification information.

Accordingly, the relay node includes the UE's RRC message in the payload of F3AP and transfers the same to the donor base station via the signaling radio bearer. Further, for transmission via the signaling radio bearer, the donor base station performs ciphering by the PDCP entity.

Figure 11:
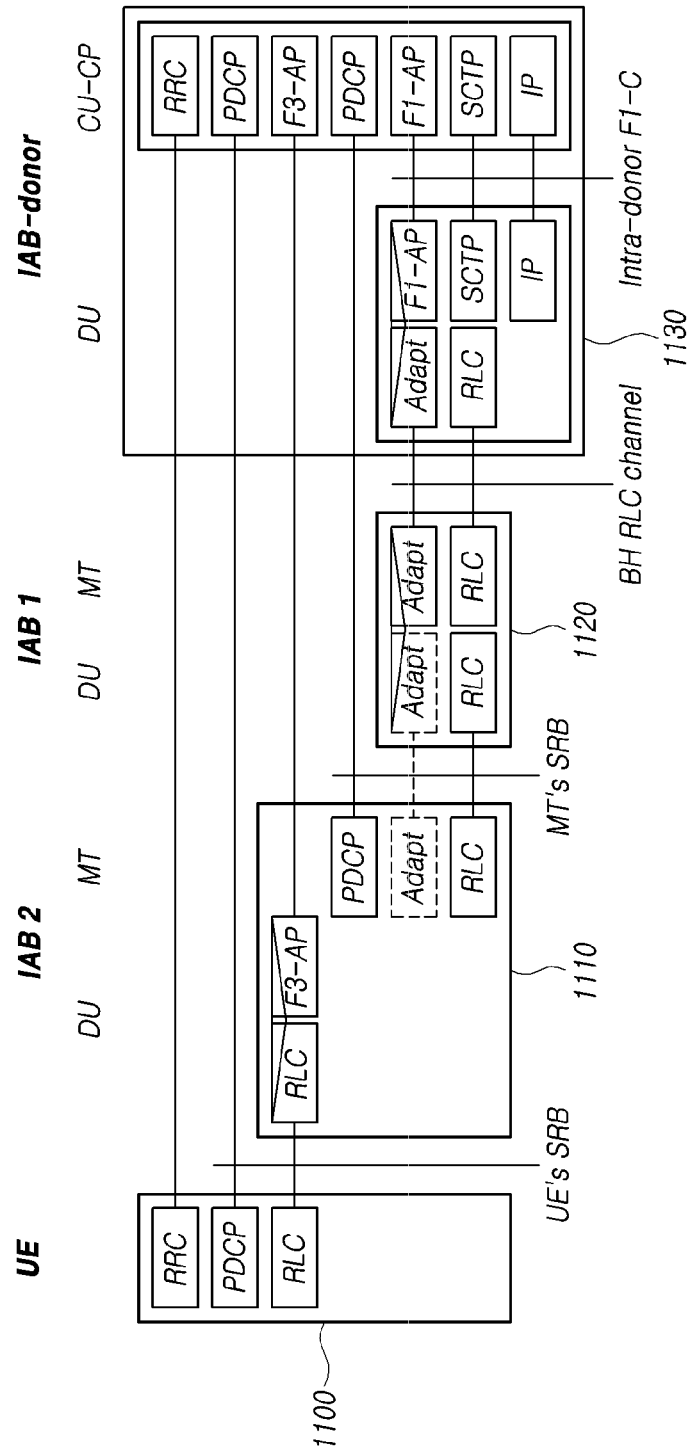
FIG. 11 is a view illustrating an exemplary protocol structure for transferring an RRC message according to an embodiment.

FIG. 11 is a view illustrating an exemplary protocol structure for transferring an RRC message according to an embodiment.

Referring to FIG. 11, the donor base station 1130 is assumed to have a split structure of a CU and a DU. However, the present embodiments are not limited thereto. For example, the donor base station 1130 may not have the split structure. That is, the donor base station 1130 is not limited to a specific structure.

The RRC and PDCP of the UE 1100 are connected to the RRC and PDCP layer of the donor base station 1130, and the RLC of the UE 1100 is associated with the RLC layer of the IAB 2 node 1110. The UE 1100 transmits the RRC message to the lead-in RLC entity of the IAB 2 node 1110 via the RLC entity associated with the SRB between the UE 1100 and the donor base station 1130. The IAB 2 node 1110 is associated with the donor base station 1130 via F3-AP and transfers the RRC message of the UE 1100 to the IAB 1 node 1120 via the SRB. The IAB 1 node 1120 is associated with the donor base station via the backhaul RLC channel and transfers the RLC message of the UE 1100.

As necessary, the IAB 2 node 1110 and the IAB 1 node 1120 separately process the RRC message transferred, including the adaptation entity. The RRC message may be included in the payload of the F3AP message and be transferred via the SRB.

Figure 12:
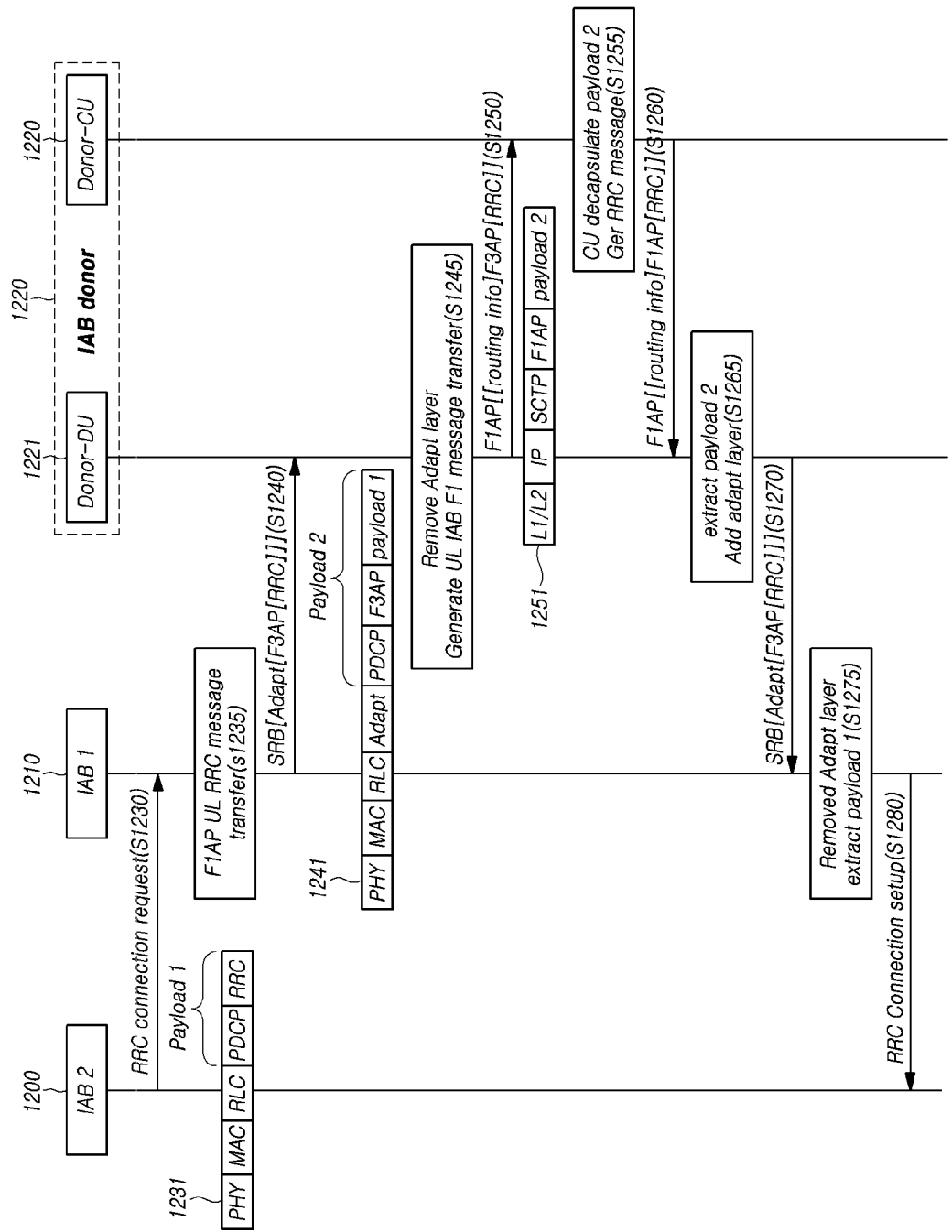
FIG. 12 is a signal flow chart illustrating a procedure for transferring an RRC message to a base station according to an embodiment.

FIG. 12 is a signal flow chart illustrating a procedure for transferring an RRC message to a base station according to an embodiment. In FIG. 12, the mobile terminate (MT) part of the IAB 2 node is connected and configured in the donor base station. Thus, on the IAB 1 node side, the IAB 2 node may be recognized like the UE and the above-described RRC message transfer procedure may be applied.

The IAB nodes may be divided into the MT part and the DU part, and the MT part is recognized as a function similar to the UE from a point of view of the donor base station or the connected IAB node. The DU part is recognized as a function similar to the DU base station from a point of view of the UE or connected IAB node. As described above, the DU base station denotes a logical node hosting the RLC, MAC, and PHY layers.

Referring to FIG. 12, the IAB 1 node 1210 receives an RRC connection request message from the IAB 2 node 1200 (S1230). The IAB 2 (1200) MT part performs normal cell discovery and cell selection and transmits an "RRC connection request" to the IAB 1 (1210) DU part. The RRC message is encapsulated as in 1231, and payload 1 transmitted to the donor base station includes PDCP and RLC data (e.g., the IAB-node2 MT part performs normal cell discovery and cell selection and sends "RRC connection request" to IAB-node1 DU part).

The IAB 1 (1210) DU part receives a payload 1 transmitted from the IAB 2 (1200) MT part. The Payload 1 denotes the PDCP PDU including the RRC message. The DU part of the IAB 1 node 1210 generates an F3AP message (i.e., initial UL RRC message) for carrying payload 1 (S1235) (IAB-node1 DU part generates F3AP message (i.e. the initial UL RRC Message) to carry the RRC message sent from IAB-node2 MT part).

The MT part of IAB 1 1210 (e.g., the IAB I MT part) transmits the encapsulated uplink F3AP message to the donor base station 1220 via the SRB (S1240)(e.g., the IAB-node1 MT part transmits the encapsulated uplink F3AP message to Donor-DU via SRB). The uplink F3AP message 1241 further includes IAB 2(1200) F3AP UE ID, and Adaptation layer. Payload 2 of 1241 includes PDCP, F3AP, and payload 1.

The DU 1221 of the donor base station 1220 recognizes a specific message type (F3AP message of IAB node). Then, the DU 1221 removes the header of the adaptation layer and encapsulates payload 2 (including the F3AP message of IAB node) in its own F3AP message (S1245)(Donor-DU learns the specific message type (F3AP message of IAB-node). Then the DU 1221 removes the header of adaptation layer, and encapsulates the payload2 (including the F3AP message of IAB-node) in its own F1AP message).

The DU 1221 of the donor base station 1220 transmits the F3AP message 1251, including the F3AP message of IAB 1 1210, to the CU 1222 of the donor base station 1220 (S1250)(Donor-DU sends its F1AP message which contains the IAB-node1's F3AP message towards the donor-CU).

The CU 1222 of the donor base station 1220 obtains payload 2 after decapsulating the F3AP message 1251 received from the DU 1221 of the donor base station 1220. The CU 1222 of the donor base station 1220 obtains the "RRC connection request" message in payload 2 via additional decapsulation (S1255)(After decapsulation of the F1AP message received from Donor-DU, Donor-CU get payload2, and obtains the "RRC connection request" message inside payload2 through further decapsulation).

The CU 1222 of the donor base station 1220 transmits the F3AP message (e.g., DL IAB F3AP message transmission) including payload 2 and routing information about payload 2 (e.g., IAB 1 address or donor base station CU address) to the DU 1221 of the donor base station 1220 (S1260) (Donor-CU sends the F1AP message (e.g. DL IAB F1AP message transfer) which contains payload2 towards the Donor-DU and routing information (e.g., IAB-node 1 address, Donor-CU address, etc.) for the payload2).

The DU 1221 of the donor base station 1220 extracts payload 2 from the received F3AP message (e.g., DL IAB F1AP message) and adds the adaptation layer header including essential routing information for payload 2 (S1265) (Donor-DU extract payload2 from the received F1AP message (e.g. DL IAB F1AP message transfer), and adds the adaptation layer header which includes essential routing information for payload2).

The DU 1221 of the donor base station 1220 transmits the encapsulated downlink F3AP message (transmission of DL RRC message in payload 2) to the IAB 1 (1210) MT part via the SRB (S1270)(Donor-DU transmits the encapsulated downlink F3AP message (DL RRC message transfer, inside payload2) towards IAB-node1 MT part via SRB).

The MT part of IAB 1 1210 recognizes a specific message type (F3AP message of IAB node) according to a specific SRB or message type indicator and identifies that the F3AP message, as adaptation header routing information, is for its own. Thereafter, the IAB 1 (1210) MT part removes the header of the adaptation layer and, after receiver processing of the PDCP layer, transfers the F3AP message including the RRC message for IAB 2 1200 to the IAB 1 (1210) DU part (S1280)(IAB-node1 MT part learns the specific message type (F3AP message of IAB-node) according to the specific SRB or the message type indicator, and knows that the F3AP message is for itself from the routing information in the adaptation header. Then IAB-node 1 MT part removes the header of adaptation layer, and forwards the F3AP message which contains the RRC message for IAB-node 2 after receiver processing of the PDCP layer to IAB-node 1 DU part. The IAB-node 1 DU part extracts the RRC message from F3-AP message).

The DU part of IAB 1 1210 extracts the RRC message from the F3AP message (IAB-node1 DU parts send the RRC message (RRC connection setup) towards IAB-node 2).

As described above, the relay node includes the RRC message in the F3AP message and transfers the same to the donor base station via the SRB.

Hereinafter, a relay node protocol structure supporting the above-described operations will be described. For ease of description, uplink data transmission operations for a user plane protocol structure are described below. However, the present embodiments are not limited thereto. For example, the same method is applicable to control plane protocol structures. Although a protocol structure via two hops is described below, any structure via any number of hops falls within the category of the disclosure.

Figure 13:
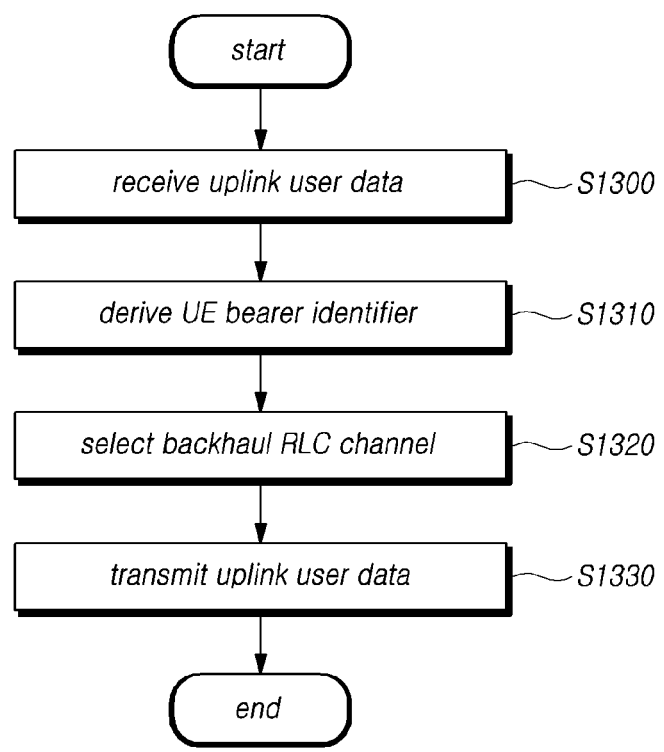
FIG. 13 is a flowchart illustrating the operation of transferring uplink user data by a relay node according to an embodiment.

FIG. 13 is a flowchart illustrating an operation of transferring uplink user data by a relay node according to an embodiment.

Referring to FIG. 13, the relay node may perform receiving uplink user data from the UE in a method of processing uplink user data (S1300). As described above, relay node maybe an integrated access and backhaul (IAB) node that is connected with the UE via radio access and is connected with another relay node or donor base station via radio backhaul. Or, the relay node may denote an IAB node connected with another relay node via radio backhaul and connected with the donor base station via radio backhaul. The relay node receives uplink user data which is transmitted to the donor base station from the UE.

The relay node may perform deriving a UE bearer identifier (UE-bearer-ID) using logical channel identification information associated with the RLC PDU of the uplink user data (S1310). Upon receiving the uplink user data, the relay node extracts the UE bearer identifier using the logical channel identification information associated with the RLC PDU. That is, the relay node may identify the UE bearer identifier using the logical channel identification information. As an example, the UE bearer identifier may denote the PDU session ID and QoS flow indicator (QFI) indicated to identify the UE's bearer from the donor base station. As another example, the UE bearer identifier may indicate the radio bearer identifier (drb-identity) indicated to identify the UE's bearer from the donor base station. As another example, the UE bearer identifier may indicate the GPRS tunneling protocol (GTP) tunnel endpoint identifier (TEID) allocated and indicated to identify the UE's bearer from the donor base station.

The relay node may perform selecting the backhaul RLC channel for transmitting uplink user data based on at least one of the UE bearer identifier and donor base station address information (S1320). For example, the relay node may select the backhaul RLC channel mapped to the UE bearer identifier using the derived UE bearer identifier. Or, the relay node may select the backhaul RLC channel for transmitting uplink user data using the donor base station address information. As an example, the donor base station address information may be a GPRS tunneling protocol (GTP) tunnel endpoint identifier (TEID) or a donor base station IP address received from the donor base station. That is, the relay node may previously receive and store the donor base station address information.

Meanwhile, the relay node may select the backhaul RLC channel based on the backhaul RLC channel mapping information included in the UE's UE context setup message received from the donor base station. That is, the backhaul RLC channel mapping information is required to select the backhaul RLC channel using at least one of the above-described UE bearer identifier and donor base station address information. The relay node may receive the backhaul RLC channel mapping information from the donor base station.

For example, the backhaul RLC channel mapping information may include N:1 (N is a natural number not less than 1) mapping information between the backhaul RLC channel and at least one of the UE bearer identifier and donor base station address information. Or, the backhaul RLC channel mapping information may include mapping information between the UE bearer identifier and donor base station address information.

Meanwhile, the backhaul RLC channel may be configured according to the logical channel configuration information of the RRC message. That is, the relay node may configure the backhaul RLC channel using the logical channel configuration information of the RRC message.

The relay node may perform transmitting the uplink user data to the donor base station or another relay node via the selected backhaul RLC channel (S1330). The relay node may include at least one information of the UE bearer identifier, donor base station address information, logical channel identification information, and mapping information between the backhaul RLC channel and the logical channel identification information, in the uplink user data and transmit the same, by the adaptation entity of the relay node. For example, the relay node may add UE bearer identifier information to the uplink user data in transmitting the uplink user data via the backhaul RLC channel. Adding the UE bearer identifier information may be performed by the adaptation entity of the relay node. Or, the donor base station address information and the above-described mapping information may be included in the transmitted uplink user data so that the donor base station or another relay node may utilize the information.

Meanwhile, the relay node may further include, before receiving uplink user data from the UE, receiving an RRC connection request message from the UE and transmitting the RRC connection request message to the donor base station via a signaling radio bearer or F3AP message. As described above in connection with FIGS. 10 to 12, the relay node may include the UE's RRC message in the F3AP message and transfer the same via the SRB. The signaling radio bearer or F3AP message may be configured to include donor base station address information in the adaptation entity.

As described above, upon receiving the uplink user data transmitted to the donor base station from the UE, the relay node may separately process uplink user data using various pieces of information, such as logical channel identification information or mapping information. That is, the relay node determines the donor base station or another relay node for transferring the uplink user data and transmits the same via the selected backhaul RLC channel.

Various example protocols for transferring uplink user data are described below with reference to the drawings. For ease of description, the relay node is denoted an IAB node below.

Figure 14:
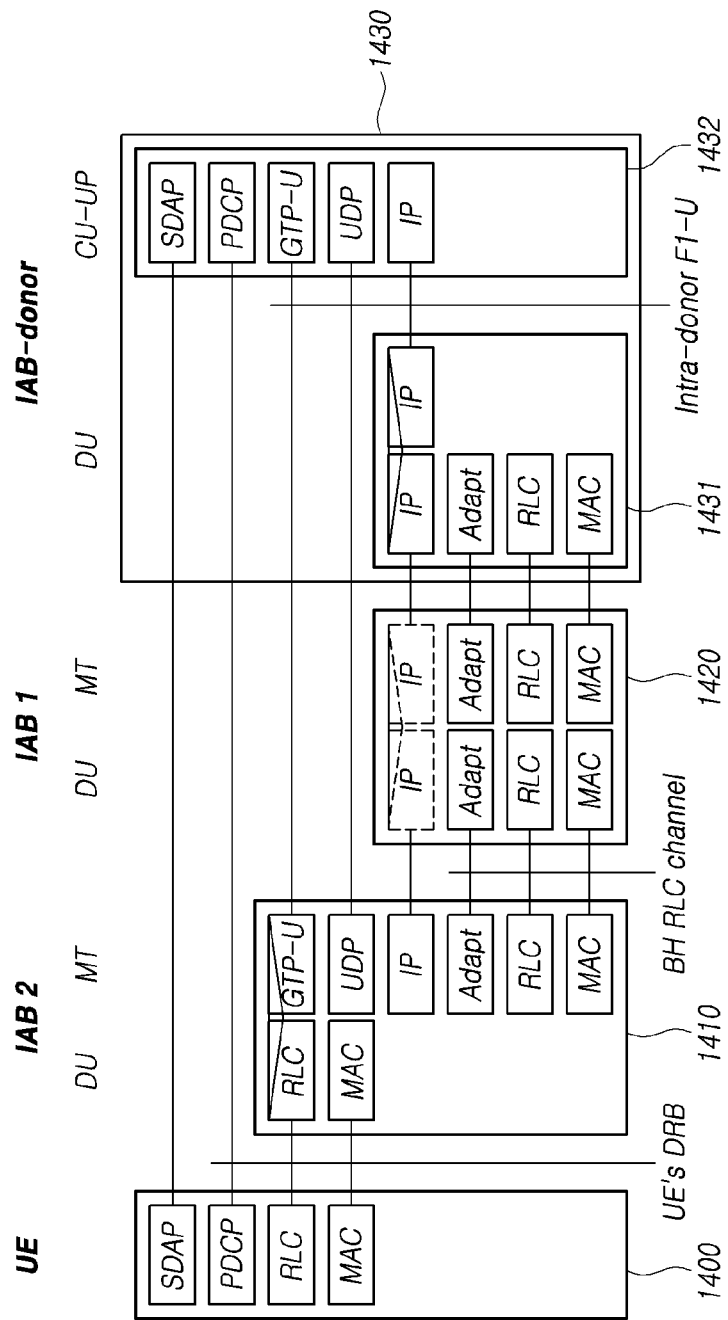
FIG. 14 is a view illustrating an exemplary protocol structure for transmitting uplink user data according to an embodiment.

FIG. 14 is a view illustrating an exemplary protocol structure for transmitting uplink user data according to an embodiment.

Referring to FIG. 14, a IAB 2 node 1410 receives uplink user data from the UE 1400 via a DRB. The IAB 2 node 1410 derives a UE bearer identifier using logical channel identification information associated with the RLC PDU of the received uplink user data. Further, the relay node selects a backhaul RLC channel for transmitting uplink user data based on at least one of the UE bearer identifier and donor base station address information.

The received uplink user data is transferred to the IAB 1 node 1420 via the MT part. To transmit the uplink user data to the IAB 1 node 1420, the IAB 2 node 1410 selects the backhaul RLC channel. Further, the IAB 2 node 1410 may further include at least one information of UE bearer identifier, address information for the donor base station 1430, logical channel identification information, and mapping information between logical channel identification information and backhaul RLC channel in the uplink user data transmitted to the IAB 1 node 1420.

The IAB 1 node 1420 transfers the message including the uplink user data received from the IAB 2 node 1410 to the DU 1431 of the donor base station 1430. The DU 1431 of the donor base station 1430 transfers to the CU 1432 via the IP layer.

Figure 15:
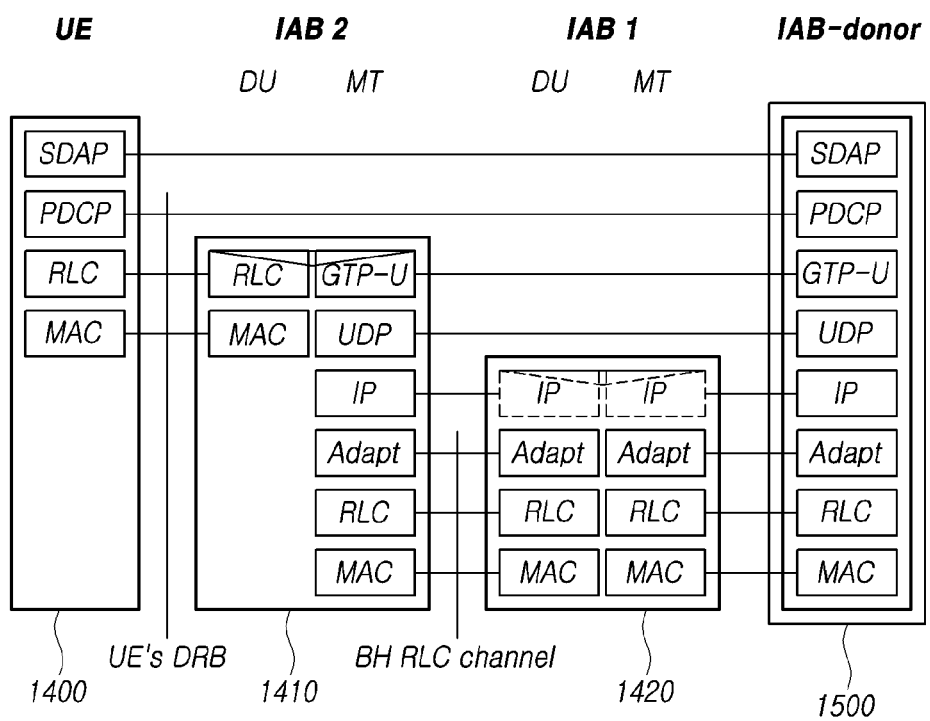
FIG. 15 is a view illustrating an exemplary protocol structure for transferring uplink user data from a single-structure donor base station according to an embodiment.

FIG. 15 is a view illustrating an exemplary protocol structure for transferring uplink user data from a single-structure donor base station according to an embodiment.

The protocol structure of FIG. 14 is identically applied to a UE 1400, a IAB 2 node 1410, and a IAB 1 node 1420 in FIG. 15. However, the donor base station 1500 may not have a split structure of a CU and a DU. That is, the donor base station may perform the operations from the SDAP layer to the MAC layer in one logical node. Besides, the transmission path and operations of uplink user data are the same as those of FIG. 14, and no description thereof is given below.

Protocol Structure Embodiment for Performing L3 Forwarding in IAB Node

Figure 16:
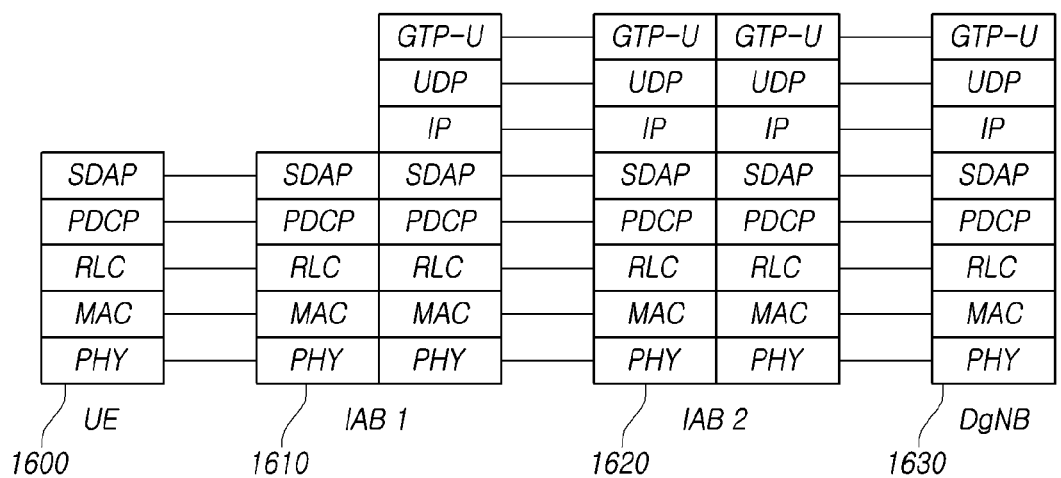
FIG. 16 is a view illustrating an exemplary protocol structure for transmitting uplink user data according to an embodiment.

FIG. 16 is a view illustrating an exemplary protocol structure for transmitting uplink user data according to an embodiment.

Referring to FIG. 16, (each) IAB nodes 1610 and 1620 may forward user data by L3 (IP layer) similarly to the typical LTE RN. To that end, the first hop IAB node (IAB-1) 1610 having a direct radio connection with the UE 1600 needs to support the functions of layer 3 or higher layers, as well as the functions of layer 2. For example, the IAB 1 node 1610 may configure/reconfigure radio connection parameters in the UE 1600 via an RRC connection reconfiguration message. Accordingly, the IAB 1 node 1610 supporting layer 3 may control the cell with the cell identifier which the IAB 1 node 1610 owns and may allow it to look to the UE 1600 like a normal base station. However, in this case, in processing user data, delay for IP packet processing in addition to layer 2 processing may be increased.

User data forwarding between IAB nodes (e.g., the IAB 1 node and the IAB 2 node) may be performed via GTP-U (or GTP-U/UDP/IP. For control plane data, GTP-C or GTP/SCTP protocol is used). Accordingly, traffic processing separated/differentiated per user or per radio bearer (or per flow) may be possible. As an example, the IAB node 1610 or 1620 may differentiate each data traffic via the GTP TEID. To that end, the IAB node 1610 or 1620 may previously receive the GTP-TEID and donor base station IP address as the donor base station address information. Typically, the GTP-TEID is information for unequivocally identifying the tunnel endpoint in the receive GTP-U protocol entity, and the TEID to be used on the transmit side of the GTP tunnel is locally allocated on the receive side of the GTP tunnel. In each network node, one GTP-U tunnel is identified with one TEID, one IP address, and one UDP port number. The TEID indicates the tunnel where the user data, which becomes the payload in the GTP-U tunnel, belongs.

In the present embodiment, the donor base station may allocate the TEID mapped to the UE bearer identifier and transfer the same, along with the donor base station IP address, to the access IAB node serving the UE. At this time, the TEID and IP address may be transferred via the RRC message or F3AP message.

As another example, the IAB node 1610 or 1620 may differentiate each data traffic (e.g., user data) via mapping information for one or more of GTP TEID, PDU session ID, S-NSSAI, QFI (QoS flow Indicator), associated QoS profile (e.g. 5QI, allocation and retention priority), DSCP, drb-identity and SRB type. As an example, the IAB node 1610 or 1620 may receive uplink user data associated with the UE's QFI and PDU session ID from the UE 1600, map the received uplink user data to the GTP-TEID, and separately transmit the results to the donor base station.

User data forwarding between the IAB node 1610 or 1620 and the donor base station DgNB may be performed via GTP-U (or GTP-U/UDP/IP. For control plane data, GTP-C or GTP/SCTP protocol is used). Accordingly, traffic processing separated/differentiated per user or per radio bearer (or per flow) may be possible. As an example, each data traffic may be differentiated via the GTP TEID. As another example, each data traffic may be differentiated via mapping information for one or more of GTP TEID, PDU session ID, S-NSSAI, and QFI.

As an example, the above-described mapping information may be indicated to the IAB node via OAM. As another example, the above-described mapping information may be indicated to the IAB node via the RRC message by the donor base station. As another example, the above-described mapping information may be indicated to the IAB node via the F3AP message by the donor base station. As another example, the above-described mapping information may include mapping information between one or more pieces of information of E-RAB, PDU session resource information (e.g., PDU session ID, S-NSSAI), QFI/QCI, QFI-associated QoS profile, DSCP (Diffserv code point), TEID, Transport layer Address (e.g., donor base station IP address), drb-identity and SRB type. Specifically, as an example, QFI and transport layer information (TEID, transport layer address) mapping information may be included. Or, mapping information between DSCP and radio bearer identification information (drb-identity or SRB type) may be included. Or, mapping information between QFI and radio bearer identification information (drb-identity or SRB type) may be included. Thus, the field including one or more pieces of information of PDU session resource information included in the GTP-U header (e.g., PDU session ID, S-NSSAI), QFI/QCI, QFI-associated QoS profile, DSCP (Diffserv code point), TEID, Transport layer Address (e.g., donor base station IP address), drb-identity and SRB type is associated with one flow/bearer on the interface between IAB nodes or the interface between the IAB and the donor base station. One or more pieces of information of PDU session resource information (e.g., PDU session ID, S-NSSAI), QFI/QCI, QFI-associated QoS profile, DSCP (Diffserv code point), TEID, Transport layer Address (e.g., donor base station IP address), drb-identity and SRB type may be used to identify the radio bearer of the radio interface between the UE and the IAB node. As an example, the IAB node 1610 or 1620 may receive uplink user data associated with the UE's QFI and PDU session ID from the UE 1600, map the received uplink user data to the GTP-TEID and donor base station IP address, and separately transmit the results to the donor base station.

Figure 17:
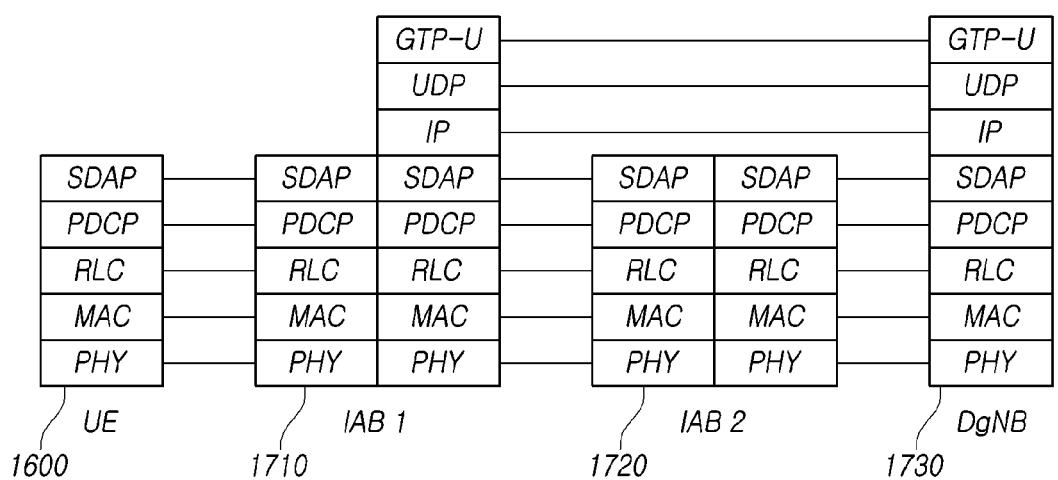
FIG. 17 is a view illustrating an exemplary protocol structure for transmitting uplink user data according to an embodiment.

Protocol Structure Embodiment for Performing L3 Forwarding in First Hop IAB Node Connected with UE and L2 Forwarding in Other IAB Node FIG. 17 is a view illustrating an exemplary protocol structure for transmitting uplink user data according to an embodiment.

Referring to FIG. 17, the first hop IAB node 1710 configuring a direct radio connection with the UE 1600 may forward user data from L3 (IP layer), similar to the typical LTE RN. To that end, the first hop IAB node (IAB-1) 1710 having a direct radio connection with the UE 1600 needs to support the functions of layer 3 or higher layers, as well as the functions of layer 2. For example, the IAB 1 node 1710 may configure/reconfigure radio connection parameters via an RRC connection reconfiguration message. Accordingly, the IAB 1 node 1710 supporting layer 3 may control the cell with the cell identifier which the IAB 1 node 1610 owns and may allow it to look to the UE 1600 like a normal base station. However, in this case, delay for IP packet processing in addition to layer 2 processing may be increased.

Figure 18:
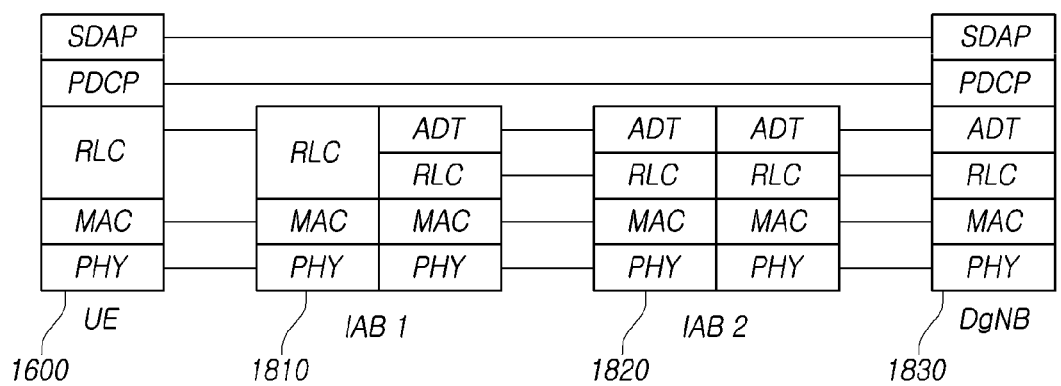
FIG. 18 is a view illustrating an exemplary protocol structure for transmitting uplink user data according to an embodiment.
Figure 19:
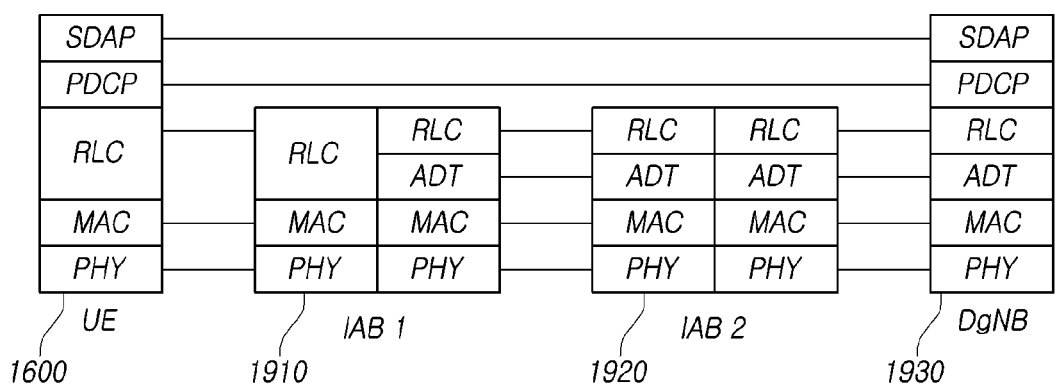
FIG. 19 is a view illustrating an exemplary protocol structure for transmitting uplink user data according to an embodiment.

User data may be transferred via the GTP-U (or GTP-U/UDP/IP. For control plane data, GTP-C or GTP/SCTP protocol is used) protocol between the donor base station 1730 and the first hop IAB node 1710 with a direct radio connection with the UE 1600. As an example, the donor base station 1730 and the first hop IAB node 1710 with a direct radio connection with the UE 1600 may perform traffic processing separated/differentiated per user or per radio bearer (or per flow) via the GTP TEID. As another example, the IAB node 1710 and the donor base station 1730 may differentiate per-user, per-radio bearer traffic via the mapping information for one or more of the GTP TEID, Transport layer Address (e.g., donor base station IP address), PDU session ID, S-NSSAI, QFI (QoS flow Indicator), QFI-associated QoS profile, DSCP, drb-identity and SRB type. As an example, the first hop IAB node 1710 may receive uplink user data associated with the UE's QFI and PDU session ID from the UE 1600, map the same to the GTP-TEID and donor base station IP address, and separately transmit the results to the donor base station. As another example, if the first hop IAB node 1710 separately forwards user data on the RLC layer as shown in FIGS. 18 and 19, the first hop IAB node 1710 may receive uplink user data associated with the logical channel identification information mapped to the UE bearer identifier or the UE's PDU session ID and QFI from the UE 1600 and map the same to the GTP-TEID and donor base station IP address and separately transmit the results to the donor base station.

Meanwhile, user data forwarding by an IAB node (IAB 2, 1720), not the first hop IAB node 1710 having a direct radio connection with the UE 1600, may be performed on the L2 basis. As an example, user data may be forwarded from the SDAP layer as shown in FIG. 17. Accordingly, it is possible to perform data forwarding meeting per-flow QoS. Each QoS flow may perform its corresponding data forwarding processing via its corresponding QoS parameter/profile (e.g., one or more parameters of 5G QoS Identifier, Allocation and Retention Priority, Guaranteed Flow Bit Rate, Maximum Flow Bit Rate, and Reflective QoS Attribute) and may be mapped to the DRB according to the QoS profile associated with the QFI (QoS flow Indicator). However, since the IAB 2 node 1720 may not differentiate data per UE, the transmit SDAP entity or the adaptation layer entity higher than the SDAP may add the UE identifier for differentiation for each UE and transmit the same. The mapped flow/data may be selected based on the UE identifier added by the IAB 2 node 1720. The receive SDAP entity or the adaptation layer entity higher than the SDAP may remove the UE identifier for per-UE differentiation and transmit the same to the higher layer.

Or, the IAB 2 node 1720 of FIG. 17 may be operated without the SDAP layer. That is, the IAB 2 node 1720 may forward user data from the PDCP layer. Accordingly, data forwarding for differentiating radio bearers may be performed, and ciphering and/or integrity protection may be provided from each link. However, since the IAB 2 node 1720 is incapable of per-UE differentiation, the transmit SDAP entity, or the adaptation layer entity between the SDAP and PDCP entities, or the PDCP entity may add the UE identifier for per-UE differentiation and transmit and, based thereupon, the IAB 2 node 1720 may select the mapped radio bearer. The receive SDAP entity, the adaptation layer entity between the SDAP and PDCP entities, or the PDCP entity is required to remove the UE identifier for per-UE differentiation and transmit the same to the higher layer.

Or, the IAB 2 node 1720 of FIG. 17 may be operated without the SDAP layer and PDCP layer. The user data may be forwarded from the adaptation layer over the RLC, the RLC layer, the adaptation layer over the RLC layer and MAC layer, or the MAC layer. Therefore, it is possible to perform data forwarding to differentiate radio bearer/RLC bearer/logical channel. However, since the IAB 2 node 1720 is unable to perform per-UE differentiation, the adaptation layer entity over the transmit RLC, the RLC layer entity, the adaptation layer entity over the RLC layer and MAC layer, or the MAC entity may add the UE bearer identifier for per-UE differentiation and transmit the same. The IAB 2 node 1720 selects the mapped radio bearer based on the UE bearer identifier, and the adaptation layer entity over the receive RLC of the donor base station 1730, the RLC layer entity, the adaptation layer entity over the RLC layer and the MAC layer, or the MAC entity is required to remove the UE bearer identifier for per-UE differentiation and transmit the same to the higher layer.

Or, L2 forwarding by the IAB 2 node 1720 may be provided by referring to the embodiments (L2 forwarding by IAB node-1, and L2 forwarding by IAB node-2) described below. The following embodiments are described below in detail.

Protocol Structure Embodiment for L2 Forwarding by IAB Node-1 (Adaptation Layer Higher than RLC is Applied)

FIG. 18 is a view illustrating an exemplary protocol structure for transmitting uplink user data according to an embodiment. FIG. 19 is a view illustrating an exemplary protocol structure for transmitting uplink user data according to an embodiment.

Referring to FIG. 18, the IAB node 1810 or 1820 may differentiate and forward user data on the layer 2 entity (sublayer 2 entity).

As an example, the IAB node 1810 or 1820 may differentiate and forward user data on the RLC layer. As another example, as shown in FIG. 18, the IAB node 1810 or 1820 may place the adaptation layer over the RLC layer and separately forward the user data on the adaptation layer. As another example, as shown in FIG. 19, the IAB node 1910 or 1920 may place the adaptation layer under the RLC layer (or over the MAC layer) and separately forward the user data on the RLC layer.

Hereinafter, a method of the UE for transmitting uplink data to the donor base station via the IAB node according to an embodiment will be described for ease of description. However, the embodiments of the present disclosure are not limited thereto. For example, the embodiments may be applied to downlink data transmission.

If an adaptation layer exists on the RLC layer as shown in FIG. 18, it is necessary to map the per-UE RLC bearer (or radio bearer) (for uplink data) to the RLC bearer (or radio bearer) between the donor base station 1830 and the IAB node 1810 or 1820 or the RLC bearer (or radio bearer) on the interface between IAB nodes (IAB 1 and IAB 2) on the adaptation layer entity of the first hop IAB node (IAB 1) 1810 enabling a direct radio connection with the UE 1600. Here, the RLC bearer (RLC channel) indicates a lower layer portion of the radio bearer configuration consisting of the RLC and logical channel. It indicates the logical connection or channel between the transmit RLC entity of the IAB 1 node and the receive RLC entity of IAB 2 on, e.g., the radio backhaul interface between the IAB 1 node and the IAB 2 node in uplink data transmission via the IAB node. For ease of description, the terms "RLC bearer" and "radio bearer" may be interchangeably used herein. For example, RLC bearer may be referred to as a radio bearer, and radio bearer may be referred to as a RLC bearer. The RLC bearer may be replaced with the radio bearer, and the radio bearer may be replaced with the RLC bearer.

If there is no restriction on the number of RLC bearers (or radio bearers) providable on the interface between IAB nodes (IAB 1 and IAB 2) or the interface between the IAB node and the donor base station (between IAB 2 and DgNB), the per-UE RLC bearers (or radio bearers) on the adaptation layer entity of the first hop IAB node (IAB 1) having a direct radio connection with the UE and the RLC bearers (or radio bearers) on the interface between IAB nodes (between IAB 1 and IAB 2) may be configured to be mapped in a one-to-one manner. As an example, the one-to-one mapping configuration may be made by the donor base station via an RRC message to the IAB 1 node. As another example, the one-to-one mapping configuration may be made by the donor base station via an F3AP message to the IAB 1 node. As another example, the one-to-one mapping configuration may be made as the OAM indicates mapping information to the IAB 1 node.

Or, per-RLC bearers (or radio bearers) and RLC bearers (or radio bearers) between the IAB node and the donor base station (between IAB 2 and DgNB) may be configured to be mapped in a one-to-one manner. As an example, the one-to-one mapping configuration may be made as the donor base station transmits an RRC message to the IAB 2 node. As another example, the one-to-one mapping configuration may be made by the donor base station via an F3AP message to the IAB 2 node. As another example, the one-to-one mapping configuration may be made as the OAM indicates mapping information to the IAB 1 node.

If there is a restriction on the number of RLC bearers (or radio bearers) providable on the interface between IAB nodes (IAB 1 and IAB 2) or the interface between the IAB node and the donor base station (between IAB 2 and DgNB), it is necessary to map i) the per-UE RLC bearers (or radio bearers) on the adaptation layer entity of the first hop IAB node (IAB 2) having a direct radio connection with the UE and the RLC bearers (or radio bearers) on the interface between IAB nodes (between IAB 1 and IAB 2) or ii) the per-UE RLC bearers (or radio bearers) on the IAB node (IAB 2) in the middle and the RLC bearers (or radio bearers) between the IAB node and the donor base station (between IAB 2 and DgNB) in an N:1 manner. Here, N is any natural number.

There is a limit to the maximum number of radio bearers currently providable between the UE and the base station (or the maximum number of radio bearers providable by the UE). For example, the maximum number of DRBs providable is eight in LTE. In NR, the maximum number of DRBs providable is at most 32. Thus, in the case where the IAB node receives multiple IAB nodes and the UE and relays the same to the donor base station, if the maximum number of DRBs providable by the IAB node is identical to the maximum number of DRBs providable by a regular UE, it is necessary to restrict the number of radio bearers/RLC bearers mapped to the radio bearers with the UE capable of relaying between the IAB node and the donor base station or between the IAB node and the IAB node.

For example, assume the following scenario. The IAB 1 node is connected to UE-1, UE-2, and UE-3, and three radio bearers (radio bearer-1, radio bearer-2, and radio bearer-3) are configured in UE-1. Two radio bearers (radio bearer-a and radio bearer-b) are configured in UE-2. Two radio bearers (radio bearer-A and radio bearer-B) are configured in UE-3. No UE is directly connected to the IAB 2 node, and no other IAB node than IAB 1 is directly connected to IAB 2. No UE is directly connected to the donor base station, and no other IAB node than IAB 2 is directly connected thereto.

Under the assumed scenario, for uplink data processing, the number of transmit RLC entities of UE-1 is three, the number of transmit RLC entities of UE-2 is two, and the number of transmit RLC entities of UE 3 is two. The number of receive RLC entities of the peered IAB 1 node is three (UE-1 peered entity), two (UE-2 peered entity), or two (UE-3 peered entity). The donor base station may determine the number of transmit RLC entities for transmission of data from the IAB 1 node to the IAB 2 node. For example, the number of radio bearers/RLC bearers capable of same packet forwarding processing may be determined depending on the radio bearer/RLC bearer type/attribute to be provided per UE. As an example, if UE-1's radio bearer-1, UE-2's radio bearer-a, and UE-3's radio bearer-A are radio bearers capable of same packet forwarding processing (e.g., default bearers of the same PDU session or radio bearers providing the same service), the three radio bearers/RLC bearers may be mapped to one transmit RLC entity from the IAB 1 node to the IAB 2 node (or one RLC bearer on the interface between the IAB 1 node and the IAB 2 node) and data may be processed/transferred. This may be provided from the adaptation layer entity. Thus, the receive RLC entity (RLC-RX1) peered to the transmit RLC entity (RLC-TX1) of UE-1 radio bearer-1 at the IAB 1 node may be mapped to one transmit RLC entity (marked "RLC entity-11" for ease of description) to the IAB 2 node. The receive RLC entity (RLC-RXa) peered to the transmit RLC entity (RLC-TXa) of UE-2 radio bearer-a at the IAB 1 node may be mapped to the same transmit RLC entity (RLC entity-11) to the IAB 2 node. The receive RLC entity (RLC-RXA) peered to the transmit RLC entity (RLC-TXA) of UE-3 radio bearer-A at the IAB 1 node may be mapped to the same transmit RLC entity (RLC entity-11) to the IAB 2 node.

Meanwhile, upon uplink data transmission, the RLC entities (or RLC configuration information) in the UE may be differentiated by the logical channel identification information. Thus, the mapping between the receive RLC entity of the IAB 1 node peered to the RLC entity of a specific radio bearer/RLC bearer of a specific UE and the transmit RLC entity of the IAB 1 node peered to the receive RLC entity of the IAB 2 node may be provided by associating the pieces of logical channel identification information. As an example, the donor base station may provide the same by configuring, in IAB 1, the mapping information between the logical channel identification information of the specific radio bearer/RLC bearer of the specific UE and the logical channel identification information of the RLC bearer on the radio interface between IAB-1 and IAB 2. This may be indicated from the donor base station to the IAB-1 node via an RRC message or F3AP message. The donor base station may indicate the configuration information including the mapping information corresponding to the IAB node upon indicating the RRC message to the UE so as to configure the radio resource in the UE. For example, upon transmitting the UE's RRC reconfiguration message to the UE via the IAB node, the donor base station may also include the corresponding mapping information to the IAB node via the F3AP message including the corresponding RRC reconfiguration message.

As another method, the RLC entity in the UE may be differentiated by the radio bearer identification information associated with the PDCP entity. As an example, the donor base station may indicate/configure, in the IAB 1 node, the mapping information between the radio bearer identification information of the specific radio bearer/RLC bearer of the specific UE and the logical channel identification information (or radio bearer identification information) on the radio interface between the IAB 1 node and the IAB 2 node, thereby providing the radio bearer identification information associated with the PDCP entity.

The UE radio bearer identification information associated with the PDCP entity may be included and provided in the adaptation layer configuration information on the RRC message for IAB 1 radio resource configuration. Or, the UE radio bearer identification information associated with the PDCP entity may be included and provided in the RLC configuration information on the RRC message for IAB 1 radio resource configuration. Or, the UE radio bearer identification information associated with the PDCP entity may be included and provided in the logical channel configuration information on the RRC message for IAB 1 radio resource configuration. Or, the UE radio bearer identification information associated with the PDCP entity may be included and provided in the F3AP message transmitted to the IAB 1 node. The configuration information/mapping information may include the UE identifier, the UE's radio bearer identifier/logical channel identification information, and logical channel identification information (or radio bearer identification information) for the RLC bearer on the radio interface between IAB 1 and IAB 2 mapped thereto. The mapping information may be indicated from the donor base station to the IAB 1 node via an RRC message or F3AP message. The donor base station may indicate the configuration information including the mapping information corresponding to the IAB 1 node upon indicating the RRC message to the UE so as to configure the radio resource in the UE. For example, upon transmitting the UE's RRC reconfiguration message to the UE via the IAB node, the donor base station may also include the corresponding mapping information to the IAB node via the F3AP message including the corresponding RRC reconfiguration message.

As another method, in the case where the first hop IAB node differentiates the per-UE radio bearer data via the GTP TEID and transfers the same to the donor base station as shown in FIGS. 15 to 17, the UE's RLC entity (or RLC configuration information) at the IAB 1 node may be mapped to the GTP TEID and be transmitted with the per-UE radio bearers differentiated. The TEID at the IAB 1 node may be mapped to the transmit RLC entity of the IAB 1 node peered to the receive RLC entity of the IAB 2 node with the GTP TEID and the donor base station IP address associated with the logical channel identification information. As an example, the donor base station may indicate/configure, in the IAB 1 node, the mapping information between the TEID mapped to the specific radio bearer/RLC bearer of the specific UE, donor base station IP address and the logical channel identification information (or radio bearer identification information) on the radio interface between the IAB 1 node and the IAB 2 node. The information may be included and provided in the adaptation layer configuration information on the RRC message for IAB 1 radio resource configuration. Or, the information may be included and provided in the RLC configuration information on the RRC message for IAB 1 radio resource configuration. Alternatively, the information may be included and provided in the logical channel configuration information on the RRC message for IAB 1 radio resource configuration. Or, the information may be included and provided in the F3AP message transmitted to the IAB 1 node. The configuration information/mapping information may include the UE identifier, the TEID associated with the UE's radio bearer identifier/logical channel identification information, donor base station IP address and logical channel identification information (or radio bearer identification information) for the RLC bearer on the radio interface between the IAB 1 node and the IAB 2 node mapped thereto. The mapping information may be indicated from the donor base station to the IAB 1 node via an RRC message or F3AP message. The donor base station may indicate the configuration information including the mapping information corresponding to the IAB node 1 upon indicating the RRC message to the UE to configure the radio resource in the UE. For example, upon transmitting the UE's RRC reconfiguration message to the UE via the IAB node, the donor base station may also include the corresponding mapping information to the IAB node via the F3AP message including the corresponding RRC reconfiguration message.

In a similar manner to the above-described method, it requires information for mapping the RLC bearer on the interface between the IAB nodes (between IAB 1 and IAB 2) (or the RLC bearer (or radio bearer) per UE at the IAB node (IAB 2) positioned in the middle) to the RLC bearer (or radio bearer) between the IAB node and the donor base station (between IAB 2 and DgNB). For example, the donor base station may determine the number of radio bearers/RLC bearers capable of same packet forwarding processing at the IAB node (IAB 2) positioned in the middle depending on the radio bearer/RLC bearer type/attribute to be provided per UE. Or, the donor base station may determine the number of radio bearers/RLC bearers capable of same packet forwarding processing at the IAB node (IAB 2) positioned in the middle depending on the radio bearer/RLC bearer type/attribute provided from the IAB node (IAB 1) connected to the lower layer.

Upon uplink data transmission, the RLC entities (or RLC configuration information) in the UE may be differentiated by the logical channel identification information. Thus, the mapping information for instructing to transmit data belonging to the specific radio bearer/RLC bearer of the specific UE from the IAB node to a next hop IAB node (or the donor base station if the next hop is the donor base station) may be provided via the logical channel identification information. As an example, the donor base station may provide the same by configuring, in the IAB 2 node, the mapping information between the logical channel identification information of the specific radio bearer/RLC bearer of the specific UE and the logical channel identification information of the RLC bearer on the radio interface between IAB 2 and the donor base station. This may be indicated from the donor base station to the IAB 2 node via the RRC message. The donor base station may indicate the configuration information including the mapping information corresponding to the IAB node upon indicating the RRC message to the UE so as to configure the radio resource in the UE.

As another method, the RLC entity in the UE may be differentiated by the radio bearer identification information associated with the PDCP entity. As an example, the donor base station may provide this by indicating/configuring, in the IAB 2 node, the mapping information between the radio bearer identification information of the specific radio bearer/RLC bearer of the specific UE and the logical channel identification information (or radio bearer identification information) on the radio interface between the IAB 1 node and the IAB 2 node.

The mapping information may be included and provided in the adaptation layer configuration information. The mapping information may include the UE identifier, the UE's radio bearer identifier/logical channel identification information, and logical channel identification information (or radio bearer identification information) for the RLC bearer on the radio interface between the IAB-2 node and the donor base station, mapped thereto. The IAB-2 node may transfer the data to the MAC entity according to the configuration mapping information.

The donor base station adaptation layer entity may transfer the data to the associated PDCP entity based on the UE identifier and logical channel identification information (or radio bearer identification information) included in the received data.

As another example, the mapping information between the logical channel identification information of the RLC bearer on the radio interface between the IAB 1 node and the IAB 2 node and the logical channel identification information of the RLC bearer on the radio interface between the IAB 2 node and the donor base station may be configured in the IAB 2 node. The mapping information may be indicated from the donor base station to the IAB 2 node via an RRC message or F3AP message. When this is indicated from the donor base station to the IAB 1 node via the RRC message or when the RRC message is indicated to the UE to configure a radio resource in the UE, the configuration information including the mapping information corresponding to the IAB 2 node may be indicated via the F3AP message.

As another method, the RLC entity in the UE may be differentiated by the radio bearer identification information associated with the PDCP entity. As an example, the donor base station may provide the same by configuring, in the IAB 2 node, the mapping information between the radio bearer identification information of the RLC bearer on the radio interface between the IAB 1 node and the IAB 2 node and the logical channel identification information (or radio bearer identification information) on the radio interface between the IAB 2 node and the donor base station. The IAB 2 node may add one or more pieces of information to the header of the data according to the configuration mapping information and transfer the header-added data to the corresponding MAC entity. The donor base station adaptation layer entity may transfer the data to the associated PDCP entity based on the UE bearer identifier and logical channel identification information (or radio bearer identification information) included in the received data.

As another method, in the case where the first hop IAB node differentiates the per-UE radio bearer data via the GTP TEID and transfers the same to the donor base station as shown in FIGS. 15 to 17, the IAB 2 node may separately transmit the per-UE radio bearers using the donor base station IP address and the GTP TEID mapped to the UE's RLC entity (or RLC configuration information). The IAB 1 node may add the TEID and donor base station IP address for the user data (e.g., IP packet) to the header via the radio bearer per UE on the adaptation layer and transmit the same. The adaptation layer of the IAB 2 node may associate the TEID and donor base station IP address to the logical channel identification information of the transmit RLC entity and transmit the same. As an example, the donor base station may indicate/configure, in the IAB 2 node, the mapping information between the TEID mapped to the specific radio bearer/RLC bearer of the specific UE and the logical channel identification information (or radio bearer identification information) on the radio interface between IAB 2 and the donor base station. The information may be included and provided in the adaptation layer configuration information on the RRC message for IAB 2 radio resource configuration. Or, the information may be included and provided in the RLC configuration information on the RRC message for IAB 2 radio resource configuration. Or, the information may be included and provided in the logical channel configuration information on the RRC message for IAB 2 radio resource configuration. Or, the information may be included and provided in the F3AP message between the donor base station and the IAB 2 node. The configuration information/mapping information may include the UE identifier, the TEID associated with the UE's radio bearer identifier/logical channel identification information, donor base station IP address and logical channel identification information (or radio bearer identification information) for the RLC bearer on the radio interface between IAB 2 and the donor base station mapped thereto. The mapping information may be indicated from the donor base station to the IAB 2 node via an RRC message or F3AP message. The donor base station may indicate, via the F3AP message, the configuration information including the mapping information corresponding to the IAB node 2 upon indicating the RRC message to the UE to configure the radio resource in the UE.

Protocol Structure Embodiment for L2 Forwarding by IAB Node-2 (Adaptation Layer Lower than RLC is Applied)

As another example, if the adaptation layer is configured between the MAC and RLC layers (or the adaptation function is provided using the MAC header on the MAC layer) as shown in FIG. 19, the per-UE radio bearer for uplink data needs to be mapped to the radio bearer/RLC bearer on the interface between IAB nodes or the radio bearer/RLC bearer between the IAB node and the donor base station at the adaptation layer entity of the first hop IAB node (IAB 1) having a direct radio connection with the UE. The number of RLC entities (RLC bearers) on the interface between IAB nodes or the number of RLC entities (or RLC bearers) between the IAB node and the donor base station may be set to be identical to the number of per-UE, per-radio bearer RLC entities (per-UE RLC bearers) of the IAB 1 node. For example, the IAB 1 node is connected with UE-1 and UE-2, and two radio bearers are configured in UE-1, and three radio bearers are configured in UE-2. No UE is directly connected to the IAB 2 node, and no other IAB node than IAB 1 is directly connected to IAB 2. Where no UE is directly connected to the donor base station, and no other IAB node than IAB 2 is directly connected thereto, the number of RLC entities in UE 1 for uplink data processing is two, and the number of RLC entities in UE 2 is three. The number of receive RLC entities of the IAB 1 node receiving data from UE 1 and UE 2 is the sum of 2 and 3, i.e., 5. The number of transmit RLC entities from the IAB 1 node to the IAB 2 node is five as well. The number of receive RLC entities of the IAB 2 node is five. The number of transmit RLC entities from the IAB 2 node to the donor base station is five, and the number of receive RLC entities of the donor base station is five. Each interface has the same number of RLC bearers.

If an adaptation layer is configured between the MAC and RLC layers (or if the adaptation function is provided using the MAC header on the MAC layer), the UE and the donor base station have a PDCP entity per radio bearer and, for regular radio bearers, not duplicate bearers, the PDCP entities and the RLC entities are mapped in a one-to-one manner. Thus, the same number of RLC entities as the number of radio bearers between the UE and the base station need to be configured in the IAB node as well.

Therefore, the IAB node may multiplex and transmit the MAC SDUs belonging to different radio bearers (or belonging to different logical channels) in one UE via the same transmission channel on the interface between IAB nodes or on the interface between the IAB node and the donor base station.

The IAB node may multiplex and transmit the MAC SDUs of different UEs via the same transmission channel on the interface between IAB nodes or on the interface between the IAB node and the donor base station.

The IAB node may multiplex and transmit the MAC SDUs belonging to different radio bearers (or belonging to different logical channels) of different UEs via the same transmission channel on the interface between IAB nodes or on the interface between the IAB node and the donor base station.

As an example, the transmit adaptation layer entity adds the header including the UE identifier (UE ID) and radio bearer identification information (data radio bearer identification information or SRB identification information)/logical channel identification information for the data (e.g., RLC PDU) received from the RLC entity (radio bearer) configured per UE per radio bearer. The transmit adaptation entity may transfer the header-added data to the transmit MAC entity, and the transmit MAC entity may add the logical channel identification information associated therewith to the MAC header using one or more pieces of information of the UE identifier (UE ID) and radio bearer identification information/logical channel identification information. The MAC header-added message may be multiplexed and transmitted via the same transmission channel on the interface between the IAB node and the donor base station or on the interface between IAB nodes. The receive MAC entity may identify the logical channel identification information associated therewith, using one or more pieces of information of the UE identifier (UE ID) and radio bearer identification information/logical channel identification information and separately process per-UE, per-radio bearer data. After processing the received data, the receive MAC entity transfers the processed data to the receive adaptation layer entity. The receive adaptation layer entity transfers the data (RLC PDU) to the receive RLC entity (after removing the adaptation header) mapped to the UE identifier and radio bearer identifier/logical channel identification information.

As another example, in the case where the MAC entity provides a transmit adaptation layer function, the transmit MAC entity adds the header field including the UE identifier (UE ID) for the data (e.g., RLC PDU) received from the RLC entity configured per UE, per radio bearer. Further, the transmit MAC entity adds the logical channel identification information associated therewith to the MAC header using one or more pieces of information of the UE identifier (UE ID) and radio bearer identification information (data radio bearer identification information or SRB identification information)/logical channel identification information. This may be multiplexed and transmitted via the same transmission channel on the interface between the IAB node and the donor base station or on the interface between IAB nodes. The receive MAC entity may separately process per-UE, per-radio bearer data, via the logical channel identification information associated therewith, using one or more pieces of information of the UE identifier (UE ID) and radio bearer identification information/logical channel identification information. After processing the received data, the receive MAC entity transfers the data (RLC PDU) to the receive RLC entity (after removing the adaptation header) mapped to the UE identifier and radio bearer identifier/logical channel identification information.

There is a limit to the maximum number of radio bearers currently providable between the UE and the base station. For example, the maximum number of DRBs providable is eight in LTE. In NR, the maximum number of DRBs providable is at most 32. Thus, in the case where the IAB node receives multiple IAB nodes and the UE and relays the same to the donor base station, if the maximum number of DRBs providable by the IAB node is identical to the maximum number of DRBs providable by a regular UE, such an issue may arise where the number of radio bearers and UEs capable of relaying between the IAB node and the donor base station or between IAB nodes is limited.

To address this, the radio bearer on the radio interface between the UE and the first hop IAB node (IAB 1) having a direct radio connection with the UE may be mapped to the radio bearer on the radio interface between IAB nodes or the radio bearer between the IAB node and the donor base station.

For example, assumes the following scenario.

The IAB 1 node is connected to UE-1, UE-2, and UE-3, and three radio bearers (radio bearer-1, radio bearer-2, and radio bearer-3) are configured in UE-1. Two radio bearers (radio bearer-a and radio bearer-b) are configured in UE-2. Two radio bearers (radio bearer-A and radio bearer-B) are configured in UE-3. No UE is directly connected to the IAB 2 node, and no other IAB node than IAB 1 is directly connected to IAB 2. No UE is directly connected to the donor base station, and no other IAB node than IAB 2 is directly connected thereto.

Under the above assumed scenario, for uplink data processing, the number of transmit RLC entities of UE-1 is three, the number of transmit RLC entities of UE-2 is two, and the number of transmit RLC entities of UE 3 is two. The numbers of receive RLC entities of the IAB 1 node peered thereto are 3, 2, and 2. The donor base station may determine the number of transmit RLC entities from the IAB 1 node to the IAB 2 node. For example, the number of radio bearers capable of same packet forwarding processing may be determined depending on the radio bearer type to be provided per UE. As an example, if UE-1's radio bearer-1, UE-2's radio bearer-a, and UE-3's radio bearer-A are radio bearers capable of same packet forwarding processing (e.g., default bearers of the same PDU session or radio bearers providing the same service), the three radio bearers may be mapped to one RLC entity upon transmission from the IAB 1 node to the IAB 2 node. Thus, the receive RLC entity (RLC-RX1) peered to the transmit RLC entity (RLC-TX1) of UE-1 radio bearer-1 at the IAB 1 node may be mapped to one transmit RLC entity (marked "RLC entity-11" for ease of description) to the IAB 2 node. The receive RLC entity (RLC-RXa) peered to the transmit RLC entity (RLC-TXa) of UE-2 radio bearer-a at the IAB 1 node may be mapped to the same transmit RLC entity (RLC entity-11) to the IAB 2 node. The receive RLC entity (RLC-RXA) peered to the transmit RLC entity (RLC-TXA) of UE-3 radio bearer-A at the IAB 1 node may be mapped to the same transmit RLC entity (RLC entity-11) to the IAB 2 node.

In the UE, the RLC entity may be differentiated by the logical channel identification information. Thus, the mapping between the RLC entity of the IAB 1 node peered to the RLC entity of the per-UE radio bearer and the RLC entity of the IAB 1 node peered to the RLC entity of the IAB 2 node may be provided by logical channel identification information. As an example, the donor base station may provide this by configuring, in the IAB 1 node, the mapping information between the UE's logical channel identification information and the logical channel identification information on the radio interface between the IAB 1 node and the IAB 2 node.

As another method, the RLC entity in the UE may be differentiated by the radio bearer identification information associated with the PDCP entity. As an example, the donor base station may provide this by configuring, in the IAB 1 node, the mapping information between the UE's radio bearer identification information and the logical channel identification information on the radio interface between the IAB 1 node and the IAB 2 node. This may be indicated from the donor base station to the IAB 1 node via the RRC message. The donor base station may indicate, via the F3AP message, the configuration information including the mapping information corresponding to the IAB node 1 upon indicating the RRC message so as to configure the radio resource in the UE.

As an example, the donor base station adaptation layer entity may transfer the data to the associated RLC entity based on the UE identifier and logical channel identification information (or radio bearer identification information) included in the received data. As another example, the adaptation layer may buffer/store/process data separately per RLC bearer/radio bearer/logical channel identification information, so that the receive adaptation layer may transfer the same to the associated RLC bearer per UE.

In a similar manner to the above-described method, there is a method of configuring information for mapping the RLC bearer on the interface between IAB nodes (between IAB 1 and IAB 2) (or per-UE RLC bearers at the IAB node (IAB 2) positioned in the middle) to the RLC bearer between the IAB node and the donor base station (between IAB 2 and DgNB).

Upon uplink data transmission, the RLC entities (or RLC configuration information) in the UE may be differentiated by the logical channel identification information. Thus, the mapping information for instructing to transmit data belonging to the specific radio bearer/RLC bearer of the specific UE from the IAB node to a next hop IAB node (or the donor base station if the next hop is the donor base station) may be provided via the logical channel identification information. As an example, the donor base station may provide the same by configuring, in the IAB 2 node, the mapping information between the logical channel identification information of the specific radio bearer/RLC bearer of the specific UE and the logical channel identification information of the RLC bearer on the radio interface between the IAB 2 node and the donor base station. This may be indicated from the donor base station to the IAB 2 node via an RRC message or F3AP message. Or, the donor base station may indicate, via the F3AP message, the configuration information including the mapping information corresponding to the IAB node upon indicating the RRC message to the UE so as to configure the radio resource in the UE.

As another method, the RLC entity in the UE may be differentiated by the radio bearer identification information associated with the PDCP entity. As an example, the donor base station may provide the radio bearer identification information by configuring, in the IAB 1 node, the mapping information between the radio bearer identification information of the specific radio bearer/RLC bearer of the specific UE and the logical channel identification information (or radio bearer identification information) on the radio interface between IAB 1 and IAB 2.

This may be included and provided in the adaptation layer configuration information. The configuration information/mapping information may include the UE identifier, or the UE's radio bearer identifier/logical channel identification information, and logical channel identification information (or radio bearer identification information) for the RLC bearer on the radio interface between IAB 2 and the donor base station mapped thereto. IAB 2 may transfer the data to the MAC entity according to the configured mapping information.

As an example, the donor base station adaptation layer entity may transfer the data to the associated RLC entity based on the UE identifier and logical channel identification information (or radio bearer identification information) included in the received data. As another example, the adaptation layer may buffer/store/process data separately per RLC bearer/radio bearer/logical channel identification information, so that the receive adaptation layer may transfer the same to the associated RLC bearer per UE.

As another example, this may be provided by configuring, in IAB 2, the mapping information between the logical channel identification information of the RLC bearer on the radio interface between IAB 1 and IAB 2 and the logical channel identification information of the RLC bearer on the radio interface between IAB 2 and the donor base station. This may be indicated from the donor base station to the IAB 2 node via the RRC message. Or, when this is indicated from the donor base station to the IAB 1 node via the RRC message or when the RRC message is indicated to configure a radio resource in the UE, the configuration information including the mapping information corresponding to the IAB 2 node may be indicated.

As another method, the RLC entity in the UE may be differentiated by the radio bearer identification information associated with the PDCP entity. As an example, the donor base station may provide the same by configuring, in the IAB 2 node, the mapping information between the radio bearer identification information of the RLC bearer on the radio interface between the IAB 1 node and the IAB 2 node and the logical channel identification information (or radio bearer identification information) on the radio interface between the IAB 2 node and the donor base station. The IAB 2 node may add the mapping information to the header of the data according to the configured mapping information and transfer the header-added data to the corresponding MAC entity. The donor base station adaptation layer entity may transfer the data to the associated PDCP entity based on the UE identifier and logical channel identification information (or radio bearer identification information) included in the received data.

By applying the above-described protocol structure and RRC message processing scheme, the UE may effectively configure a connection to the base station via a multi-hop relay node under the control of the donor base station and transmit and receive data.

A structure of a relay node capable of performing all or some of the above-described embodiments will be briefly described again below.

Figure 20:
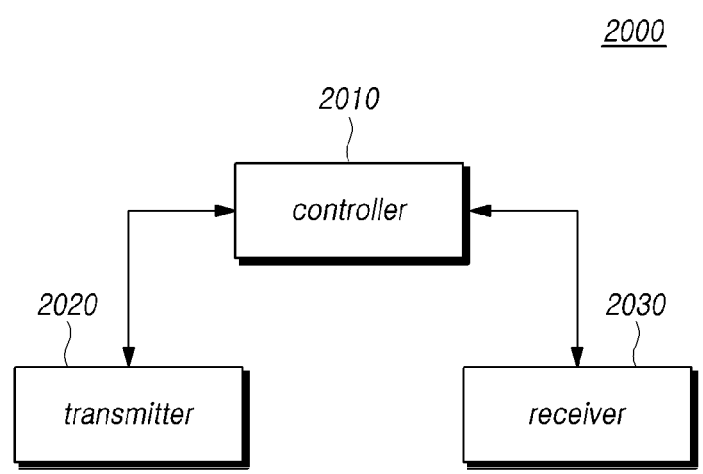
FIG. 20 is a block diagram illustrating a relay node according to an embodiment.

FIG. 20 is a view illustrating a relay node 2000 according to another embodiment.

Referring to FIG. 20, a relay node 2000 processing an RRC message includes a controller 2010 configuring a signaling radio bearer or a higher layer protocol connection with a donor base station, a receiver 2030 receiving an RRC message transmitted from a UE, and a transmitter 2020 transmitting the RRC message to the donor base station or another relay node using the signaling radio bearer or the higher layer protocol.

The controller 2010 may configure a connection with the donor base station and configure a signaling radio bearer. Or, the controller 2010 may configure a higher layer protocol connection with the donor base station. As an example, the higher layer protocol connection may be referred to as an F3 application protocol (F3AP).

For example, the relay node 2000 is an integrated access and backhaul (IAB) node that is connected with the UE via radio access and is connected with another relay node or donor base station via radio backhaul. Or, the relay node 2000 may be an IAB node connected with another relay node or donor base station via radio backhaul. In other words, the relay node 2000 may be an IAB node performing direct connection via radio access with the UE or may be an IAB node that is positioned in the middle of the relay path or on a side surface of the donor base station and is not directly connected with the UE.

The receiver 2030 may receive mapping information from the donor base station to configure a signaling radio bearer or higher layer protocol connection. For example, the controller 2010 may configure a connection using the mapping information between the backhaul RLC channel and the UE's logical channel identification information received from the donor base station. The configured signaling radio bearer is ciphered by the PDCP entity of the donor base station and the PDCP entity of the relay node 2000.

Further, the receiver 2030 receives the RRC message via radio access with the UE.

The transmitter 2020 may add the address information for the donor base station to the F3AP message including the RRC message and transmit the same, by the adaptation entity of the relay node. Here, the address information for the donor base station may mean a GPRS tunneling protocol (GTP) tunnel endpoint identifier (TEID) or a donor base station IP address received from the donor base station.

Further, the RRC message received from the UE may be added to the payload of the F3AP message and be transmitted via the signaling radio bearer. Besides, the F3AP message may further include at least one of UE identification information and signaling radio bearer identification information.

Accordingly, the transmitter 2020 includes the UE's RRC message in the payload of F3AP and transfers the same to the donor base station via the signaling radio bearer. Further, for transmission via the signaling radio bearer, the donor base station performs ciphering by the PDCP entity.

Further, the receiver 2030 may receive uplink user data from the UE in the method of processing uplink user data.

The controller 2010 may derive a UE bearer identifier (UE-bearer-ID) using logical channel identification information associated with the RLC PDU of the uplink user data. For example, the controller 2010, upon receiving the uplink user data, extracts the UE bearer identifier using the logical channel identification information associated with the RLC PDU. That is, the controller 2010 may identify the UE bearer identifier using the logical channel identification information.

The controller 2010 may select the backhaul RLC channel for transmitting uplink user data based on at least one of the UE bearer identifier and donor base station address information. For example, the controller 2010 may select the backhaul RLC channel mapped to the UE bearer identifier using the derived UE bearer identifier. Or, the controller 2010 may select the backhaul RLC channel for transmitting uplink user data using the donor base station address information. As an example, the donor base station address information may be a GPRS tunneling protocol (GTP) tunnel endpoint identifier (TEID) or a donor base station IP address received from the donor base station. That is, the controller 2010 may previously receive and store the donor base station address information.

Meanwhile, the controller 2010 may select the backhaul RLC channel based on the backhaul RLC channel mapping information included in the UE's UE context setup message received from the donor base station. That is, the backhaul RLC channel mapping information is required to select the backhaul RLC channel using at least one of the above-described UE bearer identifier and donor base station address information. The receiver 2030 may receive the backhaul RLC channel mapping information from the donor base station.

For example, the backhaul RLC channel mapping information may include 1:N (N is a natural number not less than 1) mapping information between the backhaul RLC channel and at least one of the UE bearer identifier and donor base station address information. Or, the backhaul RLC channel mapping information may include mapping information between the UE bearer identifier and donor base station address information.

Meanwhile, the backhaul RLC channel may be configured according to the logical channel configuration information of the RRC message. That is, the controller 2010 may configure the backhaul RLC channel using the logical channel configuration information of the RRC message.

The transmitter 2020 may transmit the uplink user data to the donor base station or another relay node via the selected backhaul RLC channel. The transmitter 2020 may include at least one information of the UE bearer identifier, donor base station address information, logical channel identification information, and mapping information between the backhaul RLC channel and the logical channel identification information, in the uplink user data and transmit the same, by the adaptation entity of the relay node. For example, the controller 2010 may add UE bearer identifier information to the uplink user data in transmitting the uplink user data via the backhaul RLC channel. Adding the UE bearer identifier information may be performed by the adaptation entity of the relay node. Or, the donor base station address information and the above-described mapping information may be included in the transmitted uplink user data so that the donor base station or another relay node may utilize the information.

Meanwhile, the receiver 2030 may receive an RRC connection request message from the UE before receiving uplink user data from the UE. Further, the transmitter 2020 may transmit the RRC connection request message to the donor base station via a signaling radio bearer or F3AP message. Such operation step may be further included.

Besides, the controller 2010 controls the overall operation of the relay node 2000 to include the UE's RRC message necessary to perform the above-described embodiments in the F3AP message and transfer the same via the SRB, and transmit the UE's uplink user data via the backhaul RLC channel using the logical channel identification information.

The transmitter 2020 and the receiver 2030 are used to transmit or receive signals or messages or data necessary for performing the above-described disclosure, with the UE and another relay node or donor base station.

The embodiments described above may be supported by the standard documents disclosed in at least one of the radio access systems such as IEEE 802, 3GPP, and 3GPP2. That is, the steps, configurations, and parts, which have not been described in the present embodiments, may be supported by the above-mentioned standard documents for clarifying the technical concept of the disclosure. In addition, all terms disclosed herein may be described by the standard documents set forth above.

The above-described embodiments may be implemented by any of various means. For example, the present embodiments may be implemented as hardware, firmware, software, or a combination thereof.

In the case of implementation by hardware, the method according to the present embodiments may be implemented as at least one of an application specific integrated circuit (ASIC), a digital signal processor (DSP), a digital signal processing device (DSPD), a programmable logic device (PLD), a field programmable gate array (FPGA), a processor, a controller, a microcontroller, or a microprocessor.

In the case of implementation by firmware or software, the method according to the present embodiments may be implemented in the form of an apparatus, a procedure, or a function for performing the functions or operations described above. Software code may be stored in a memory unit, and may be driven by the processor. The memory unit may be provided inside or outside the processor, and may exchange data with the processor by any of various well-known means.

In addition, the terms "system", "processor", "controller", "component", "module", "interface", "model", "unit", and the like may generally mean computer-related entity hardware, a combination of hardware and software, software, or running software. For example, the above-described components may be, but are not limited to, a process driven by a processor, a processor, a controller, a control processor, an entity, an execution thread, a program and/or a computer. For example, both the application that is running in a controller or a processor and the controller or the processor may be components. One or more components may be provided in a process and/or an execution thread, and the components may be provided in a single device (e.g., a system, a computing device, etc.), or may be distributed over two or more devices.

The above embodiments of the present disclosure have been described only for illustrative purposes, and those skilled in the art will appreciate that various modifications and changes may be made thereto without departing from the scope and spirit of the disclosure. Further, the embodiments of the disclosure are not intended to limit, but are intended to illustrate the technical idea of the disclosure, and therefore the scope of the technical idea of the disclosure is not limited by these embodiments. The scope of the present disclosure shall be construed on the basis of the accompanying claims in such a manner that all of the technical ideas included within the scope equivalent to the claims belong to the present disclosure.

The invention claimed is:

1. A method for processing a radio resource control (RRC) message by a relay node, the method comprising:
configuring one of a signaling radio bearer and a higher layer protocol connection with a donor base station;
receiving a RRC message transmitted from a user equipment (UE); and
transmitting the RRC message to one of the donor base station and another relay node using one of the signaling radio bearer and the higher layer protocol,
wherein the relay node selects the another relay node based on system information transmitted by one of the donor base station and the another relay node and transmits the RRC message directly to the another relay node,
wherein the RRC message is transmitted to the donor base station by using the higher layer protocol through a backhaul radio link control (RLC) channel selected based on backhaul RLC channel mapping information, and
wherein the backhaul RLC channel mapping information includes backhaul RLC channel mapping information for each control plane traffic type and is received in an UE context setup message of the UE.

2. The method of claim 1, wherein the relay node is an integrated access backhaul (TAB) node connected with the UE via radio access and connected with one of the another relay node and the donor base station via radio backhaul.

3. A relay node processing a radio resource control (RRC) message, the relay node comprising:
a controller configuring one of a signaling radio bearer and a higher layer protocol connection with a donor base station;
a receiver receiving a RRC message transmitted from a UE; and
a transmitter transmitting the RRC message to one of the donor base station and another relay node using one of the signaling radio bearer and the higher layer protocol,
wherein the controller selects the another relay node based on system information transmitted by the donor base station or the another relay node and transmits the RRC message directly to the another relay node,
wherein the RRC message is transmitted to the donor base station by using the higher layer protocol through a backhaul radio link control (RLC) channel selected based on backhaul RLC channel mapping information, and
wherein the backhaul RLC channel mapping information includes backhaul RLC channel mapping information for each control plane traffic type and is received in an UE context setup message of the UE.

4. The relay node of claim 3, wherein the relay node is an integrated access backhaul (IAB) node connected with the UE via radio access and connected with one of the another relay node and the donor base station via radio backhaul.

* * * * *